(12) United States Patent
Yang et al.

(10) Patent No.: US 11,304,190 B2
(45) Date of Patent: Apr. 12, 2022

(54) SEARCH SPACE DESIGN AND USE

(71) Applicant: QUALCOMM Incorporated, San Diego, CA (US)

(72) Inventors: Yang Yang, San Diego, CA (US); Wanshi Chen, San Diego, CA (US); Tao Luo, San Diego, CA (US); Hao Xu, Beijing (CN); Peter Pui Lok Ang, San Diego, CA (US); Heechoon Lee, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/802,406

(22) Filed: Nov. 2, 2017

(65) Prior Publication Data

US 2018/0132243 A1    May 10, 2018

Related U.S. Application Data

(60) Provisional application No. 62/419,390, filed on Nov. 8, 2016.

(51) Int. Cl.
*H04W 72/04* (2009.01)
*H04W 16/10* (2009.01)
(Continued)

(52) U.S. Cl.
CPC ......... *H04W 72/0453* (2013.01); *H04L 5/001* (2013.01); *H04L 5/0023* (2013.01);
(Continued)

(58) Field of Classification Search
CPC . H04W 72/1289; H04W 16/10; H04W 48/00; H04W 72/042; H04W 72/0453;
(Continued)

(56) References Cited

U.S. PATENT DOCUMENTS 8,401,542 B2 * 3/2013 Chung ................. H04L 5/0053
455/423
9,544,887 B2 * 1/2017 Kim ....................... H04L 5/001
(Continued)

FOREIGN PATENT DOCUMENTS

CN    101730985 A    6/2010
CN    103621147 A    3/2014
(Continued)

OTHER PUBLICATIONS

ISA/EP, International Search Report and Written Opinion of the International Searching Authority, Int'l Application No. PCT/US2017/059879, dated Jan. 18, 2018, European Patent Office, Rijswijk, NL, 13 pgs.

*Primary Examiner* — Ahmed Elallam
(74) *Attorney, Agent, or Firm* — Holland & Hart LLP

(57) ABSTRACT

Methods, systems, and devices for wireless communication are described. A network access device may select a search space configuration for transmission of group(s) of one or more control channel elements (CCEs) to convey a downlink control information (DCI) message. The search space configuration may include a cross-coreset configuration, such as a cross-control channel subband configuration, a cross-symbol configuration, and/or a cross-beam configuration. The network access device may transmit the DCI message according to the selected search space configuration. A user equipment (UE) may monitor, based on the search space configuration, the group(s) of one or more CCEs to detect DCI messages. The UE may detect a DCI message for it and decode the DCI message based on the monitoring. Numerous other aspects are provided.

22 Claims, 17 Drawing Sheets

(51) Int. Cl.
  *H04W 72/12* (2009.01)
  *H04W 48/12* (2009.01)
  *H04L 5/00* (2006.01)
  *H04W 48/16* (2009.01)
  *H04W 72/08* (2009.01)
  *H04L 5/14* (2006.01)

(52) U.S. Cl.
  CPC .......... *H04L 5/0053* (2013.01); *H04L 5/0092* (2013.01); *H04L 5/0094* (2013.01); *H04W 16/10* (2013.01); *H04W 48/16* (2013.01); *H04W 72/042* (2013.01); *H04W 72/08* (2013.01); *H04W 72/1289* (2013.01); *H04L 5/0064* (2013.01); *H04L 5/14* (2013.01); *H04W 48/12* (2013.01)

(58) Field of Classification Search
  CPC ..... H04W 72/08; H04W 48/12; H04W 48/16; H04L 5/001; H04L 5/0023; H04L 5/0053; H04L 5/0064; H04L 5/0092; H04L 5/0094; H04L 5/14
  See application file for complete search history.

(56) References Cited

U.S. PATENT DOCUMENTS

| | | | | |
|---|---|---|---|---|
| 9,549,404 | B2* | 1/2017 | Chen | H04L 5/00 |
| 9,872,289 | B2* | 1/2018 | Chen | H04L 1/0013 |
| 10,250,420 | B2* | 4/2019 | Nory | H04L 27/2601 |
| 10,462,739 | B2* | 10/2019 | Papasakellariou | H04W 72/042 |
| 10,462,800 | B2* | 10/2019 | Lee | H04W 24/10 |
| 10,608,795 | B2* | 3/2020 | Nory | H04L 27/2602 |
| 10,660,120 | B2* | 5/2020 | Kim | H04L 5/0053 |
| 11,005,637 | B2* | 5/2021 | Yi | H04W 24/08 |
| 11,032,765 | B2* | 6/2021 | Papasakellariou | H04L 5/0096 |
| 11,051,287 | B2* | 6/2021 | McBeath | H04L 5/003 |
| 11,057,914 | B2* | 7/2021 | You | H04W 72/1289 |
| 2009/0274109 | A1 | 11/2009 | Zhang et al. | |
| 2012/0257552 | A1* | 10/2012 | Chen | H04L 5/001 370/280 |
| 2013/0016672 | A1* | 1/2013 | Yang | H04L 1/0046 370/329 |
| 2013/0114521 | A1* | 5/2013 | Frenne | H04L 5/0053 370/329 |
| 2013/0183987 | A1* | 7/2013 | Vrzic | H04L 1/0046 455/450 |
| 2013/0242904 | A1* | 9/2013 | Sartori | H04L 5/0053 370/329 |
| 2013/0301549 | A1* | 11/2013 | Chen | H04W 4/90 370/329 |
| 2013/0315159 | A1* | 11/2013 | Xia | H04W 72/12 370/329 |
| 2014/0247816 | A1* | 9/2014 | Kim | H04L 5/0053 370/336 |
| 2014/0269595 | A1* | 9/2014 | Lee | H04L 5/0053 370/329 |
| 2014/0321420 | A1* | 10/2014 | Nakashima | H04J 13/0062 370/330 |
| 2015/0117336 | A1 | 4/2015 | Huss et al. | |
| 2015/0208398 | A1* | 7/2015 | Pan | H04L 5/001 370/329 |
| 2015/0223213 | A1* | 8/2015 | Moon | H04L 5/0048 370/329 |
| 2015/0271788 | A1* | 9/2015 | Kim | H04W 76/10 370/329 |
| 2016/0043820 | A1 | 2/2016 | Damnjanovic et al. | |
| 2016/0081107 | A1* | 3/2016 | Yang | H04L 5/001 370/280 |
| 2016/0302174 | A1* | 10/2016 | Chatterjee | H04W 72/06 |
| 2017/0135096 | A1* | 5/2017 | Kuchibhotla | H04W 72/0406 |
| 2017/0135116 | A1* | 5/2017 | Kuchibhotla | H04W 72/0406 |
| 2017/0201967 | A1* | 7/2017 | Yang | H04L 5/0073 |
| 2017/0223687 | A1* | 8/2017 | Kuchibhotla | H04W 72/044 |
| 2017/0230994 | A1* | 8/2017 | You | H04W 72/042 |
| 2017/0332359 | A1* | 11/2017 | Tsai | H04B 7/0617 |
| 2017/0366328 | A1* | 12/2017 | Seo | H04L 1/0003 |
| 2017/0366377 | A1* | 12/2017 | Papasakellariou | H04L 1/0026 |
| 2017/0367046 | A1* | 12/2017 | Papasakellariou | H04L 5/0053 |
| 2018/0035332 | A1* | 2/2018 | Agiwal | H04J 11/003 |
| 2018/0070341 | A1* | 3/2018 | Islam | H04L 5/0064 |
| 2019/0028234 | A1* | 1/2019 | Seo | H04L 5/005 |
| 2019/0058516 | A1* | 2/2019 | Yang | H04W 72/04 |
| 2019/0141679 | A1* | 5/2019 | He | H04L 5/0007 |
| 2019/0159230 | A1* | 5/2019 | Kim | H04W 72/1268 |
| 2019/0229879 | A1* | 7/2019 | Yi | H04L 5/0082 |
| 2019/0297601 | A1* | 9/2019 | You | H04L 5/0082 |
| 2019/0306847 | A1* | 10/2019 | Seo | H04W 72/046 |
| 2020/0280965 | A1* | 9/2020 | Xiong | H04W 72/042 |

FOREIGN PATENT DOCUMENTS

| | | |
|---|---|---|
| CN | 104081709 A | 10/2014 |
| CN | 105577342 A | 5/2016 |
| CN | 105992350 A | 10/2016 |
| WO | WO-2010127300 A2 | 11/2010 |
| WO | WO-2011032035 A2 | 3/2011 |
| WO | WO-2013109501 A1 | 7/2013 |
| WO | WO-2015088211 A1 | 6/2015 |

* cited by examiner

|        | CCE0 | CCE1 | CCE2 | CCE3 | CCE4 | CCE5 | CCE6 | CCE7 |
|--------|------|------|------|------|------|------|------|------|
| Beam 0 | CCE0 | CCE1 | CCE2 | CCE3 | CCE4 | CCE5 | CCE6 | CCE7 |
| Beam 1 | CCE0 | CCE1 | CCE2 | CCE3 | CCE4 | CCE5 | CCE6 | CCE7 |

AL8:

| CCE4 | CCE5 | CCE6 | CCE7 | (Beam 0) |
|------|------|------|------|----------|
| CCE0 | CCE1 | CCE2 | CCE3 | (Beam 1) |

(X-Beam)

AL8:

| CCE0 | CCE1 | CCE2 | CCE3 | CCE4 | CCE5 | CCE6 | CCE7 | (Beam 0) |
|------|------|------|------|------|------|------|------|----------|
| CCE0 | CCE1 | CCE2 | CCE3 | CCE4 | CCE5 | CCE6 | CCE7 | (Beam 1) |

(In-Beam)

AL16:

| CCE0 | CCE1 | CCE2 | CCE3 | CCE4 | CCE5 | CCE6 | CCE7 | (Beam 0) |
|------|------|------|------|------|------|------|------|----------|
| CCE0 | CCE1 | CCE2 | CCE3 | CCE4 | CCE5 | CCE6 | CCE7 | (Beam 1) |

FIG. 5

SEARCH SPACE DESIGN AND USE

CROSS REFERENCES

The present Application for Patent claims priority to U.S. Provisional Patent Application No. 62/419,390 by Yang, et al., entitled "Search Space Design and Use," filed Nov. 8, 2016, assigned to the assignee hereof, the entirety of which is herein incorporated by reference.

TECHNICAL FIELD

The following relates generally to wireless communication, and more specifically to search space design and use.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). A base station or smart radio head may communicate with a set of UEs on downlink channels (e.g., for transmissions from a base station or smart radio head to a UE) and uplink channels (e.g., for transmissions from a UE to a base station or smart radio head).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communications may include a base station or smart radio head (e.g., collectively referred to herein as network access devices) transmitting downlink control information (DCI) messages to UEs located within the coverage area of the network access device. The DCI messages may convey information necessary for the UE to receive downlink communications from the network access device, such as timing parameters, resource location information, identification information, and the like. The DCI messages may be conveyed on a control channel subband. Conventional wireless communication systems may transmit the DCI message within one control subband. Such conventional techniques may be limiting when the capacity of the control channel subband is limited. Improved methods of communication between the UE and the base station are desired.

SUMMARY

The described techniques relate to improved methods, systems, devices, or apparatuses that support search space design. Generally, the described techniques provide for a network access device and a user equipment (UE) to use cross-subband/cross-symbol/cross-beam techniques to extend the search space to guarantee coverage. For example, a base station may select or otherwise identify a search space configuration to use for transmission of group(s) of one or more control channel elements (CCEs). The group(s) of one or more CCEs may convey a downlink control information (DCI) message. The search space configuration may include a cross-control resource set (coreset) that may include, alone or in any combination(s), a cross-control channel subband configuration, a cross-symbol configuration and/or a cross-beam configuration. The base station may transmit the DCI message to the UE in accordance with the search space configuration. The UE may monitor, according to the search space configuration, the group(s) of one or more CCEs to detect the DCI message. The UE may decode the DCI message received on the group(s) of CCEs.

A method of wireless communication is described. The method may include monitoring, according to a search space configuration, one or more groups of CCEs to detect one or more DCI messages, wherein the search space configuration comprises a cross-coreset configuration, e.g., at least one of a cross-control channel subband configuration or a cross-symbol configuration and decoding, based at least in part on the monitoring, at least one DCI message of the one or more DCI messages.

An apparatus for wireless communication is described. The apparatus may include means for monitoring, according to a search space configuration, one or more groups of CCEs to detect one or more DCI messages, wherein the search space configuration comprises a cross-coreset configuration, e.g., at least one of a cross-control channel subband configuration or a cross-symbol configuration and means for decoding, based at least in part on the monitoring, at least one DCI message of the one or more DCI messages.

Another apparatus for wireless communication is described. The apparatus may include a processor, memory in electronic communication with the processor, and instructions stored in the memory. The instructions may be operable to cause the processor to monitor, according to a search space configuration, one or more groups of CCEs to detect one or more DCI messages, wherein the search space configuration comprises a cross-coreset configuration, e.g., at least one of a cross-control channel subband configuration or a cross-symbol configuration and decode, based at least in part on the monitoring, at least one DCI message of the one or more DCI messages.

A non-transitory computer readable medium for wireless communication is described. The non-transitory computer-readable medium may include instructions operable to cause a processor to monitor, according to a search space configuration, one or more groups of CCEs to detect one or more DCI messages, wherein the search space configuration comprises a cross-coreset configuration, e.g., at least one of a cross-control channel subband configuration or a cross-symbol configuration and decode, based at least in part on the monitoring, at least one DCI message of the one or more DCI messages.

In some examples of the method, apparatus, and non-transitory computer-readable medium described above the cross-coreset configuration comprises the cross-control channel subband configuration and may further include processes, features, means, or instructions for monitoring, based at least in part on the cross-control channel subband configuration, the one or more groups of CCEs on at least two control channel subbands to detect the at least one DCI message.

In some examples of the method, apparatus, and non-transitory computer-readable medium described above the cross-coreset configuration comprises the cross-symbol configuration and may further include processes, features, means, or instructions for monitoring, based at least in part on the cross-symbol configuration, the one or more groups of CCEs during at least two symbols to detect the at least one DCI message.

In some examples of the method, apparatus, and non-transitory computer-readable medium described above the cross-coreset configuration comprises the cross-beam configuration and may further include processes, features, means, or instructions for monitoring, based at least in part on a cross-beam configuration, the one or more groups of CCEs on at least two beamformed signals to detect the at least one DCI message.

Some examples of the method, apparatus, and non-transitory computer-readable medium described above may further include processes, features, means, or instructions for receiving an enabling indication of the search space configuration.

In some examples of the method, apparatus, and non-transitory computer-readable medium described above, the enabling indication may be received in at least one of a system information block (SIB) message, or a master information block (MIB) message, or a minimal system information block (MSIB) message.

Some examples of the method, apparatus, and non-transitory computer-readable medium described above may further include processes, features, means, or instructions for receiving a configuration message associated with the search space configuration.

In some examples of the method, apparatus, and non-transitory computer-readable medium described above, the configuration message may be received in a radio resource control (RRC) message.

Some examples of the method, apparatus, and non-transitory computer-readable medium described above may further include processes, features, means, or instructions for identifying, based at least in part on the search space configuration, an aggregation level associated with the one or more groups of CCEs.

In some examples of the method, apparatus, and non-transitory computer-readable medium described above, the one or more groups of CCEs comprises at least one of the at least one DCI message repeated on a plurality of CCEs on different control channel subbands or the at least one DCI message spread across a plurality of CCEs on different control channel subbands.

In some examples of the method, apparatus, and non-transitory computer-readable medium described above, the one or more groups of CCEs comprises at least one of the at least one DCI message repeated on a plurality of CCEs during different symbols or the at least one DCI message spread across a plurality of CCEs during different symbols.

In some examples of the method, apparatus, and non-transitory computer-readable medium described above, the cross-coreset configuration comprises the cross-control channel subband configuration that is associated with a subband bandwidth comprising a plurality of tones.

A method of wireless communication is described. The method may include selecting a search space configuration for transmission of one or more groups of control channel elements (CCEs) to convey a downlink control information (DCI) message, wherein the search space configuration comprises the cross-coreset configuration, e.g., at least one of a cross-control channel subband configuration or a cross-symbol configuration and transmitting, based at least in part on the selecting, the DCI message.

An apparatus for wireless communication is described. The apparatus may include means for selecting a search space configuration for transmission of one or more groups of control channel elements (CCEs) to convey a downlink control information (DCI) message, wherein the search space configuration comprises the cross-coreset configuration, e.g., at least one of a cross-control channel subband configuration or a cross-symbol configuration and means for transmitting, based at least in part on the selecting, the DCI message.

Another apparatus for wireless communication is described. The apparatus may include a processor, memory in electronic communication with the processor, and instructions stored in the memory. The instructions may be operable to cause the processor to select a search space configuration for transmission of one or more groups of control channel elements (CCEs) to convey a downlink control information (DCI) message, wherein the search space configuration comprises the cross-coreset configuration, e.g., at least one of a cross-control channel subband configuration or a cross-symbol configuration and transmit, based at least in part on the selecting, the DCI message.

A non-transitory computer readable medium for wireless communication is described. The non-transitory computer-readable medium may include instructions operable to cause a processor to select a search space configuration for transmission of one or more groups of control channel elements (CCEs) to convey a downlink control information (DCI) message, wherein the search space configuration comprises the cross-coreset configuration, e.g., at least one of a cross-control channel subband configuration or a cross-symbol configuration and transmit, based at least in part on the selecting, the DCI message.

In some examples of the method, apparatus, and non-transitory computer-readable medium described above the cross-coreset configuration comprises the cross-control channel subband configuration and may further include processes, features, means, or instructions for transmitting, based at least in part on the cross-control channel subband configuration, the one or more groups of CCEs on at least two control channel subbands to convey the DCI message.

In some examples of the method, apparatus, and non-transitory computer-readable medium described above the cross-coreset configuration comprises the cross-symbol configuration and may further include processes, features, means, or instructions for transmitting, based at least in part on the cross-symbol configuration, the one or more groups of CCEs during at least two symbols to convey the DCI message.

In some examples of the method, apparatus, and non-transitory computer-readable medium described above the cross-coreset configuration comprises the cross-beam configuration and may further include processes, features, means, or instructions for transmitting, based at least in part on a cross-beam configuration, the one or more groups of CCEs on at least two beamformed signals to convey the at least one DCI message.

Some examples of the method, apparatus, and non-transitory computer-readable medium described above may further include processes, features, means, or instructions for transmitting an enabling indication of the search space configuration.

In some examples of the method, apparatus, and non-transitory computer-readable medium described above, the enabling indication may be transmitted in at least one of a SIB message, or a MIB message, or a MSIB message.

Some examples of the method, apparatus, and non-transitory computer-readable medium described above may further include processes, features, means, or instructions for transmitting a configuration message associated with the search space configuration.

In some examples of the method, apparatus, and non-transitory computer-readable medium described above, the configuration message may be transmitted in a RRC message.

Some examples of the method, apparatus, and non-transitory computer-readable medium described above may further include processes, features, means, or instructions for selecting, based at least in part on the search space configuration, an aggregation level associated with the one or more groups of CCEs.

In some examples of the method, apparatus, and non-transitory computer-readable medium described above, the one or more groups of CCEs comprises at least one of the DCI message repeated on a plurality of CCEs on different control channel subbands or the DCI message spread across a plurality of CCEs on different control channel subbands.

In some examples of the method, apparatus, and non-transitory computer-readable medium described above, the one or more groups of CCEs comprises at least one of the DCI message repeated on a plurality of CCEs during different symbols or the DCI message spread across a plurality of CCEs during different symbols.

In some examples of the method, apparatus, and non-transitory computer-readable medium described above, the cross-coreset configuration comprises the cross-control channel subband configuration that is associated with a subband bandwidth comprising a plurality of tones.

BRIEF DESCRIPTION OF THE DRAWINGS

FIG. 5 illustrates an example of a cross-beam configuration that supports search space design and use in accordance with aspects of the present disclosure.

DETAILED DESCRIPTION

A user equipment (UE) may use one or more search space hypotheses to detect transmission of a downlink control information (DCI) message from a network access device such as a base station. A search space, in this context, generally refers to a set of rules that determine the control channel elements (CCEs) on which a UE expects to find the DCI message for each aggregation level (AL). Conventionally, a control channel subband includes a collection of CCEs, where one or more CCEs convey the DCI message. The DCI message is transmitted with an associated AL, which is based on the number of CCEs used to convey the DCI message. Conventional AL options are $2^n$ and may include 1, 2, 4, 8, 16, etc., ALs. The control channel subband may include a group of CCEs and the search space identifies the CCEs on which the UE will blindly decode while searching for the DCI message, e.g., the UE does not know which AL was used to transmit the DCI message and/or where the DCI message is located in the CCEs. Conventional techniques may include the DCI message being limited to within a single control channel subband Aspects of the disclosure are initially described in the context of a wireless communications system. A network access device may select a search space configuration for transmission of group(s) of one or more CCEs to convey a DCI message. The search space configuration may include a cross-control resource set (coreset) configuration, such as a cross-control channel subband configuration, a cross-symbol configuration, and/or a cross-beam configuration. The network access device may transmit the DCI message according to the selected search space configuration. The UE may monitor, based on the search space configuration, the group(s) of one or more CCEs to detect DCI messages. The UE may detect a DCI message for it and decode the DCI message based on the monitoring.

Aspects of the disclosure are further illustrated by and described with reference to apparatus diagrams, system diagrams, and flowcharts that relate to search space design and use.

Figure 1:
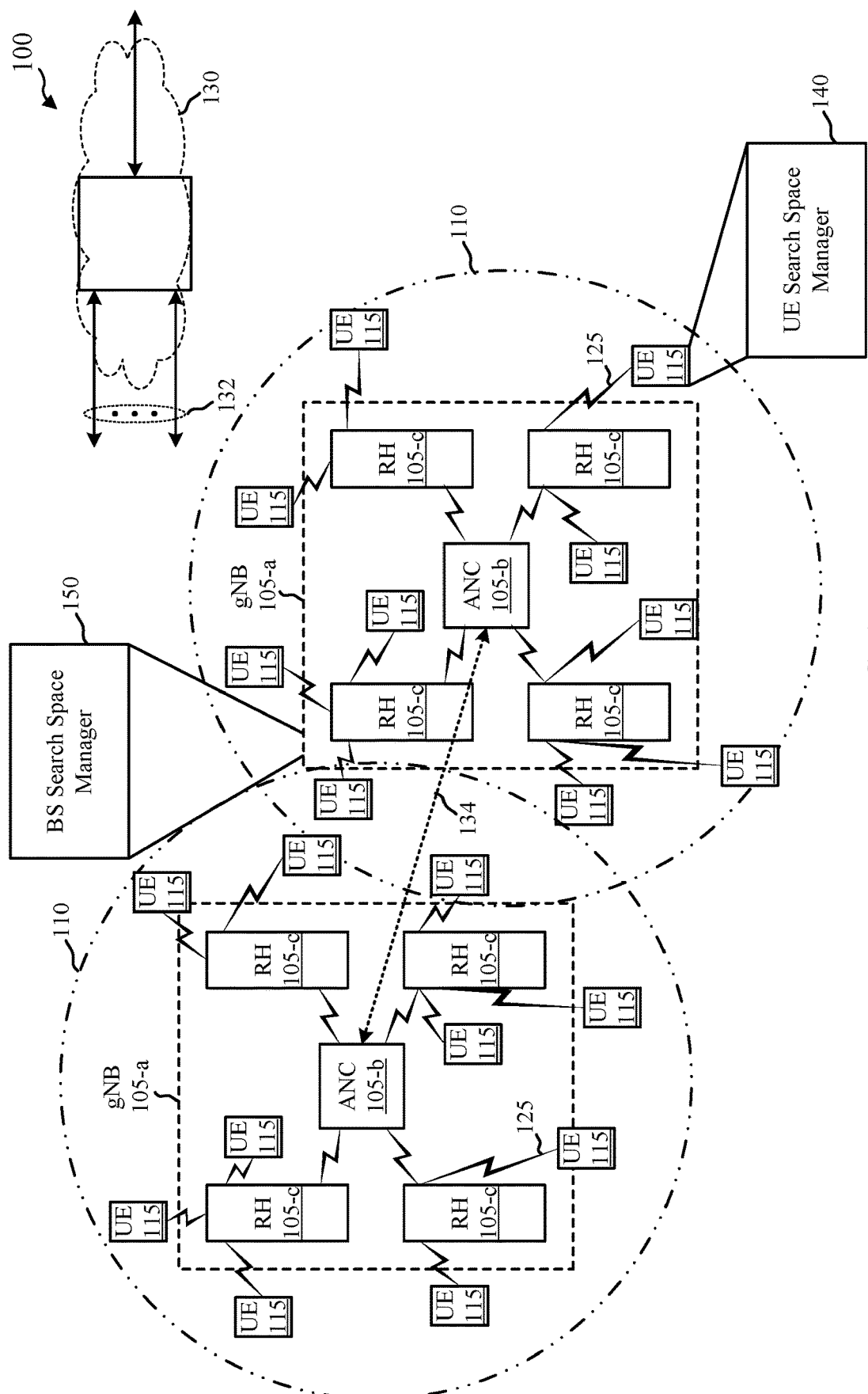
FIG. 1 illustrates an example of a system for wireless communication that supports search space design and use in accordance with aspects of the present disclosure.

FIG. 1 illustrates an example of a wireless communications system 100 in accordance with various aspects of the present disclosure. The wireless communication system 100 may include network access devices 105 (e.g., next generation NodeBs (gNBs) 105-a, access network controllers (ANCs) 105-b, and/or radio heads (RHs) 105-c), UEs 115, and a core network 130. The core network 130 may provide user authentication, access authorization, tracking, Internet Protocol (IP) connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115.

In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c). In an alternative configuration of the wireless communication system 100, the functionality of an ANC 105-b may be provided by a RH 105-c or distributed across the RHs 105-c of an gNB 105-a. In another alternative configuration of the wireless communication system 100 (e.g., an LTE/LTE-A configuration), the RHs 105-c may be replaced with base stations, the ANCs 105-b may be replaced by base station controllers (or links to the core network 130), and the gNBs 105-a may be replaced by eNBs. In some examples, the wireless communication system 100 may include a mix of RHs 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or RHs 105-c may have similar frame timing, and transmissions from different gNBs 105-a and/or RHs 105-c may be approximately aligned in time. For asynchronous operation, the gNBs 105-a and/or RHs 105-c may have different frame timings, and transmissions from different gNBs 105-a and/or RHs 105-c may not be aligned in time. The techniques described herein may be used for either synchronous or asynchronous operations.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of network access devices 105 (e.g., gNBs 105-a, RHs 105-c, eNBs, base stations, access points, macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks from a UE 115 to a RH 105-c, and/or downlinks from a RH 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using time division multiplexing (TDM) techniques, frequency division multiplexing (FDM) techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using frequency division duplexing (FDD) techniques (e.g., using paired spectrum resources) or time division duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., RHs 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and network access devices 105. Devices operating in mmW or EHF bands may have multiple antennas to allow beamforming. That is, a network access device 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a network access device 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

MIMO wireless systems use a transmission scheme between a transmitter (e.g. a network access device) and a receiver (e.g. a UE), where both transmitter and receiver are equipped with multiple antennas. Some portions of wireless communications system 100 may use beamforming. For example, network access device 105 may have an antenna array with a number of rows and columns of antenna ports that the network access device 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, TDD or a combination of both.

In some examples, a UE 115 may include a UE search space manager 140. The search space manager 140 may be used to monitor, according to a search space configuration, group(s) of one or more CCEs to detect DCI message(s). The search space configuration may include a cross-coreset configuration, such as a cross-control channel subband configuration, a cross-symbol configuration, and/or a cross-beam configuration. The UE 115 may decode, based on the monitoring, at least one DCI message.

In some examples, a network access device 105 may include a base station search space manager 150. The search space manager 150 may be used to select a search space configuration for transmission of group(s) of one or more CCEs to convey a DCI message. The search space configuration may include a cross-coreset configuration, such as a cross-control channel subband configuration, a cross-symbol configuration, and/or a cross-beam configuration. The network access device 105 may transmit, according to the selected search space configuration, the DCI message to the UE 115.

Figure 2:
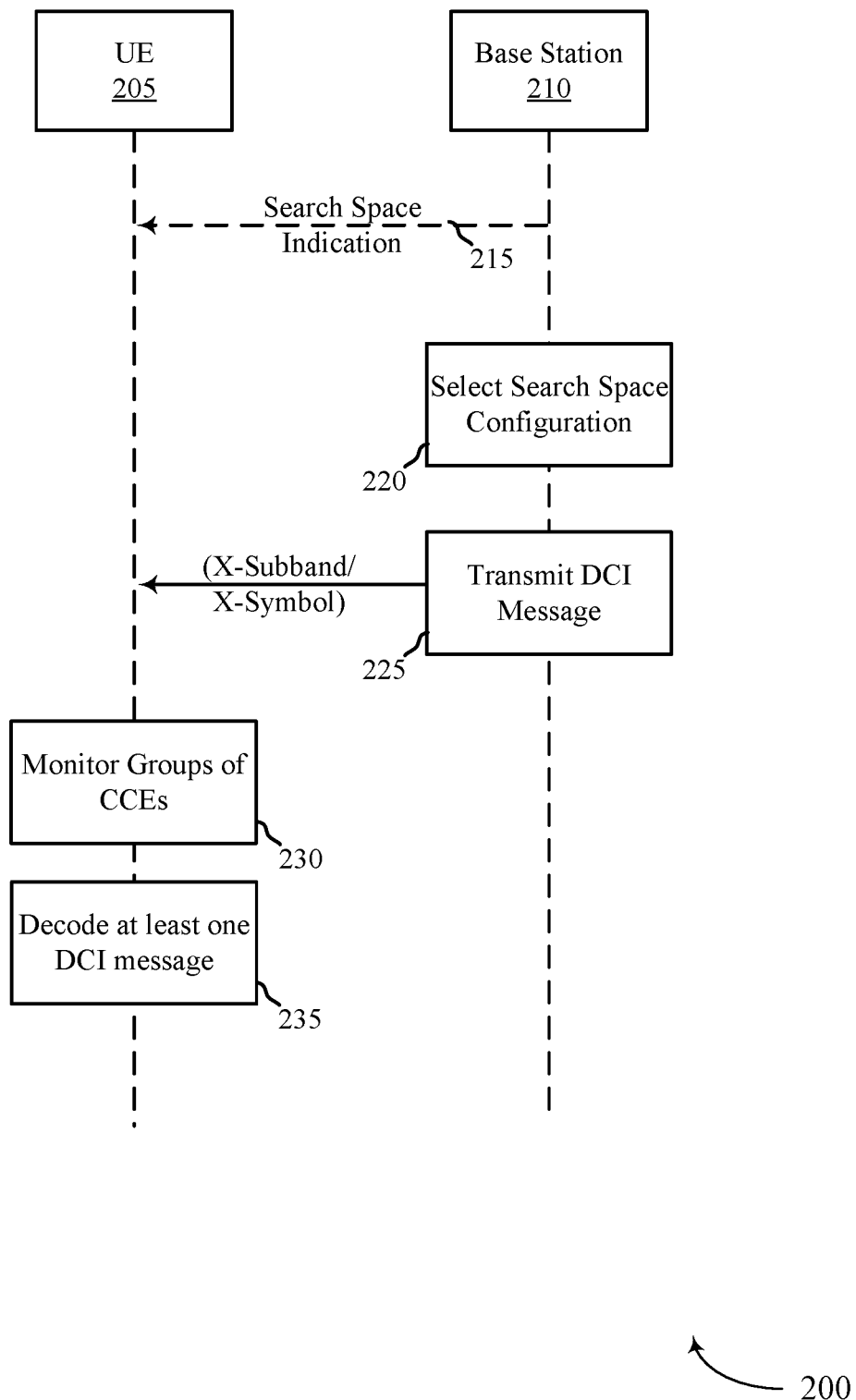
FIG. 2 illustrates an example of a process flow that supports search space design and use in accordance with aspects of the present disclosure.

FIG. 2 illustrates an example of a process flow 200 for search space design and use, in accordance with aspects of the present disclosure. Process flow 200 may implement aspects of wireless communication system 100 of FIG. 1. Process flow 200 may include a UE 205 and a base station 210, which may be examples of UEs 115 or network access devices 105 of the present disclosure.

Broadly, the process flow 200 may illustrate one example of the search space design and use of the present disclosure where the DCI message is conveyed using a cross-coreset configuration, such as a cross-control channel subband configuration, a cross-symbol configuration, and/or a cross-beam configuration. In some aspects, the UE 205 may monitor for DCI in one or more control channel subbands. The control channel may be divided into subbands. Each control channel subband may be the same as or smaller than the carrier bandwidth and may be contiguous or non-contiguous in the frequency domain. Each control channel subband may be transmitted during a symbol (e.g., an OFDM symbol) and may include one or more resource blocks (RBs), where group(s) of RBs may form a CCE or groups of CCEs may form a RB. In aspects, each control channel subband may be transmitted during a symbol and may include multiple RBs, where group(s) of RBs may form a CCE.

Each CCE may be considered a resource (such as a resource of a control resource set (or coreset)) that is used to convey a DCI message, or at least a portion of a DCI message. The DCI message may be conveyed in one or more than one CCEs, e.g., spread across multiple CCEs. For example, depending on the amount of coded bits included in the DCI message, on the modulation and coding scheme (MCS) used to convey the DCI message, and/or the amount of redundancy used to convey the DCI message, may determine the number of CCEs used to convey the DCI message. As is discussed above, this may also refer to the aggregation level (AL) for the DCI message. The AL indicates the number of CCEs used to convey a DCI message, e.g., a DCI message conveyed in one CCE has an associated AL of 1, A DCI message conveyed in two CCEs has an associated AL of 2, and so on. In aspects, aggregation level N may refer to or include one or more of N CCEs grouped or concatenated together to transmit information, such as DCI, where N may be an integer and be different for different aggregation levels.

Each control channel subband, however, may include groups of CCEs, e.g., dependent upon the bandwidth of the control channel subband, the amount of RB resources, etc. The UE 205 attempting to detect and decode DCI may not know which AL was used for the DCI message, which CCEs in the control channel subband convey the correct DCI message, and the like.

Generally, the cross-coreset configuration of the search space configuration may be based on or associated with the pattern or configuration of control resources used to convey the DCI message within the CCEs. For example, the base station 210 may use the search space configuration to populate the DCI message within the selected CCE(s). In some aspects, the search space configuration may include a cross-control channel subband configuration. For example, an AL of size "X" may be a combination of two ALs (e.g., AL X/2) or four ALs (e.g., AL X/4), where each is located in a different control channel subband. The combining rules used by UE 205 may be set to limit the number of possible combinations. Thus, the cross-control band configuration may extend the AL beyond the capacity of a single control channel subband and may improve frequency diversity.

In some aspects, the cross-coreset configuration of the search space configuration may include a cross-symbol configuration. For example, conventional techniques may limited the CCEs within a single symbol. The described techniques, however, may use cross-symbol configuration to support higher ALs. Moreover, the ALs may support CCEs having different sizes, e.g., the size of certain CCEs may be dependent upon the amount of coded information to convey, the reference signal (RS) density for each CCE, and the like. The symbol may refer to an OFDM symbol, in some examples.

In some aspects, the cross-coreset configuration of the search space configuration may include a cross-beam configuration. For example and in a mmW or other wireless communication system that uses beamforming techniques, the control channel may be transmitted in a beam sweeping fashion. The beams may be transmitted in a TDM manner, in some examples. To ensure reliable control channel transmission, the DCI message may be repeated across different beams.

In some aspects, the cross-coreset configuration of the search space configuration may include any combination of the cross-control channel configuration, the cross-symbol configuration, and/or the cross-beam configuration. Moreover, the size of CCE(s) used for any configuration may be different, e.g., based on the RS density. Process flow 200 may include DCI message transmission and decoding based on the above-described features.

At 215, base station 210 may optionally convey a search space indication. In some aspects, the indication may include a configuration message. For example, the base station 210 may configure the UE 205 on whether the search space configuration is supported, e.g., overwrite the global configuration of the UE 205. The configuration message may be conveyed in a radio resource control (RRC) message during an RRC procedure, in some examples.

In some aspects, the indication may include an enabling message where the base station 210 signals to UE 205 that the described techniques for search space design and use are enabled. The enabling message may be conveyed in a system information block (SIB), a master information block (MIB), a minimal system information block (MSIB), and the like. The indication may include one bit (or a configuration of bits) for each of the cross-control channel configuration, cross-symbol configuration, cross-beam configuration, and the like.

At 220, base station 210 may select a search space configuration for transmission of group(s) of one or more CCEs to convey a DCI message. The DCI message may be conveyed to UE 205 and may include cross-control channel subband configuration, cross-symbol configuration, and/or cross-beam configuration information. The search space configuration may be selected based on a selected AL for the transmission of the DCI message in the group(s) of CCEs. For example, the AL may determine the number of CCEs used to convey the DCI message (either repetitions of the DCI message across multiple CCEs or a DCI message that spans across the CCEs). The number of CCEs used to convey the DCI message may determine which search space configuration is selected.

At 225, base station 210 may transmit the DCI message in accordance with the search space configuration. In an example where the cross-control channel subband configuration is used, the base station 210 may transmit the group(s) of CCEs on at least two control channel subbands to convey the DCI message. In an example where the cross-symbol configuration is used, the base station 210 may transmit the group(s) of CCEs during at least two symbols to convey the DCI message. In an example where the cross-beam configuration is used, the base station 210 may transmit the group(s) of CCEs on at least two beamformed signals to convey the DCI message. As discussed, the group(s) of CCEs may be transmitted using any combination of the cross-control channel subband configuration, cross-symbol configuration, cross-beam configuration, and the like.

In some aspects, the group(s) of CCEs may include the DCI message repeated on a plurality of CCEs on different control channel subbands or the DCI message spread across a plurality of CCEs on different control channel subbands. In some aspects, the group(s) of CCEs may include the DCI message repeated on a plurality of CCEs during different symbols or the DCI message spread across a plurality of CCEs during different symbols. In some aspects, the group(s) of CCEs may include the DCI message repeated on a plurality of CCEs on different beams or the DCI message spread across a plurality of CCEs on different beams.

At 230, UE 205 may monitor, according to the search space configuration, group(s) of CCEs to detect a DCI message. Monitoring may include using a search space hypothesis based on the search space configuration. In an example where the cross-control channel subband configuration is used, the UE 205 may monitor the group(s) of CCEs on at least two control channel subbands to detect the DCI message. In an example where the cross-symbol configuration is used, the UE 205 may monitor the group(s) of one or more CCEs during at least two symbols to detect the DCI message. In an example where the cross-beam configuration is used, the UE 205 may monitor the group(s) of one or more CCEs on at least two beamformed signals to detect the DCI message. As discussed, the group(s) of CCEs may be monitored using any combination of the cross-control channel subband configuration, cross-symbol configuration, cross-beam configuration, and the like.

At 235, UE 205 may decode the DCI message. The UE 205 may decode the DCI message to obtain DCI for upcoming downlink transmissions to the UE 205 during the same or different symbols.

Figure 3:
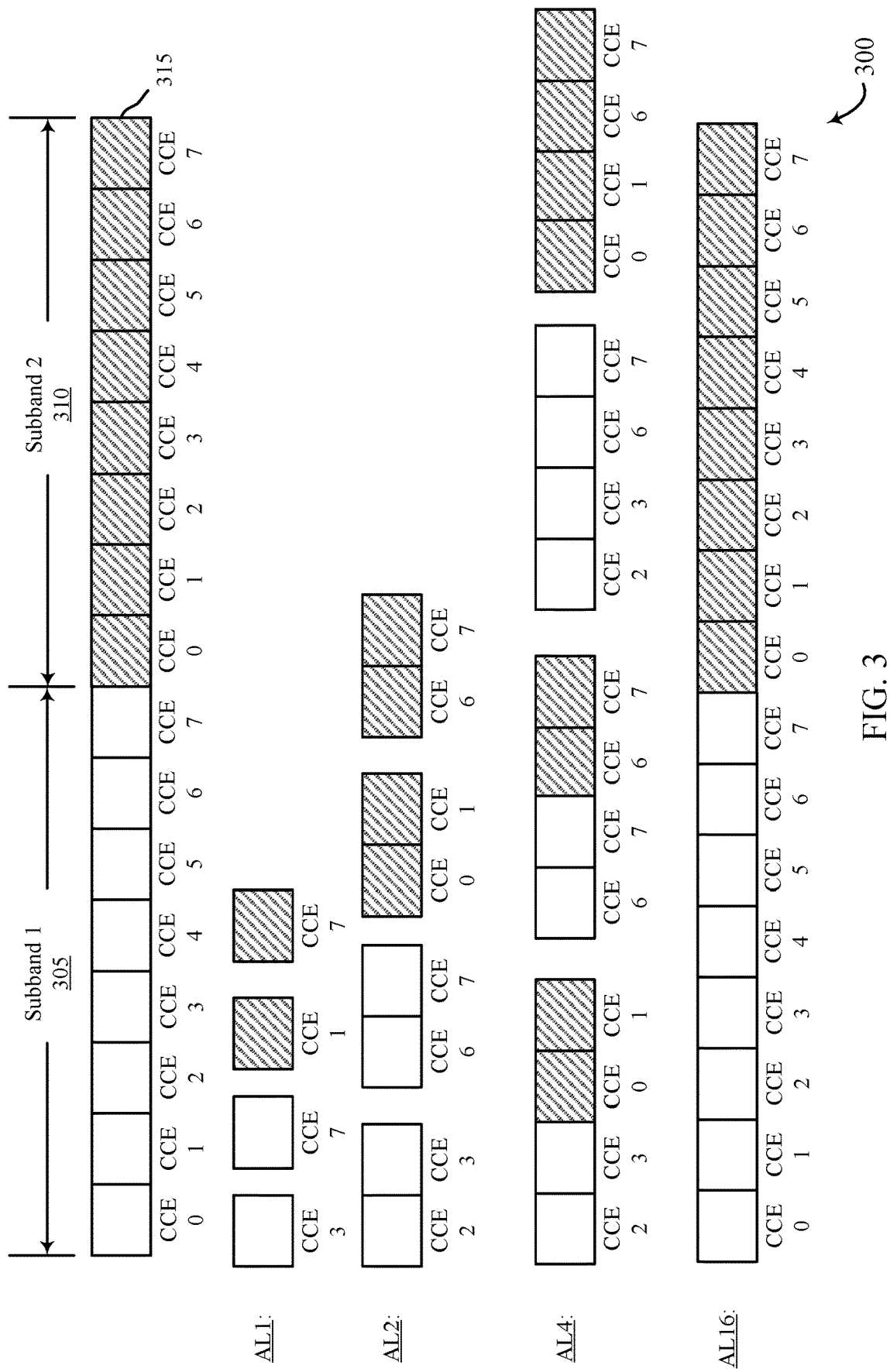
FIG. 3 illustrates an example of a cross-control channel subband configuration that supports search space design and use in accordance with aspects of the present disclosure.

FIG. 3 illustrates an example of a cross-control channel subband configuration 300 for search space design and use, in accordance with aspects of the present disclosure. Configuration 300 may implement one or more aspects of wireless communication system 100 and/or process flow 200 of FIGS. 1 and 2. Aspects of configuration 300 may be implemented by a UE and/or a base station, which may be examples of the corresponding devices described herein.

Broadly, configuration 300 illustrates one example of a cross-control channel subband configuration of a cross-coreset configuration for different ALs. For example, configuration 300 may include two control channel subbands (e.g., identified as control channel subband 305 and 310). Each control channel subband may include a plurality of CCEs 315. It is to be understood that each control channel subband may include more or less than the illustrated eight CCEs 315. Moreover, each CCE 315 may be the same or different size (e.g., based on the amount of coded bits used to convey the DCI message, based on the RS density, etc.).

In one example, a cross-control channel subband configuration may be associated with an AL of 1, e.g., one CCE 315 may be used to convey the DCI message. In the example configuration 300, the cross-control channel configuration may include using CCEs 3 and 7 of the first control channel subband 305 and CCEs 1 and 7 of second control channel subband 310. For example, CCE 3 of first control channel subband 305 may be used to convey a first indication of the DCI message. Then, one or more of CCEs 7 of first control channel subband 305 and 1 and 7 of second control channel subband 310 may be used to convey duplicates of the DCI message. Thus, the DCI message may span across multiple control channel subbands.

In one example, a cross-control channel subband configuration may be associated with an AL of 2, e.g., two CCEs 315 may be used to convey the DCI message. In the example configuration 300, the cross-control channel configuration may include using CCEs 2/3 and 6/7 of the first control channel subband 305 and CCEs 0/1 and 6/7 of second control channel subband 310 to convey the DCI message. For example, CCEs 2/3 of first control channel subband 305 may be used to convey a first indication of the DCI message. Then, one or more of CCEs 6/7 of first control channel subband 305 and/or 0/1 and 6/7 of second control channel subband 310 may be used to convey duplicates of the DCI message.

In one example, a cross-control channel subband configuration may be associated with an AL of 4, e.g., four CCEs 315 may be used to convey the DCI message. In the example configuration 300, the cross-control channel configuration may include using CCEs 2/3 of the first control channel subband 305 and CCEs 0/1 of second control channel subband 310 to convey the DCI message. For example, CCEs 2/3 of first control channel subband 305 and CCEs 0/1 of the second control channel subband 310 may be used to convey a first indication of the DCI message. Then, one or more of CCEs 6/7 of first control channel subband 305 and/or 6/7 of second control channel subband 310 may be used to convey duplicates of the DCI message. In another example, CCEs 2/3 and 6/7 of first control channel subband 305 may be used to convey a first indication of the DCI message. Then, one or more of CCEs 0/1 and 6/7 of second control channel subband 310 may be used to convey a duplicate of the DCI message.

In one example, a cross-control channel subband configuration may be associated with an AL of 16, e.g., 16 CCEs 315 may be used to convey the DCI message. In the example configuration 300, the cross-control channel configuration may include using CCEs 0-7 of the first control channel subband 305 and CCEs 0-7 of the second control channel subband 310 to convey the DCI message. Duplicates of the DCI message may be conveyed during different symbols, using different control channel subbands, and the like.

It is to be understood that the cross-control channel configuration illustrated in configuration 300 is provided by example only and is not limited to the illustrated configuration. For example, different CCEs 315 may be selected for the different ALs.

Figure 4:
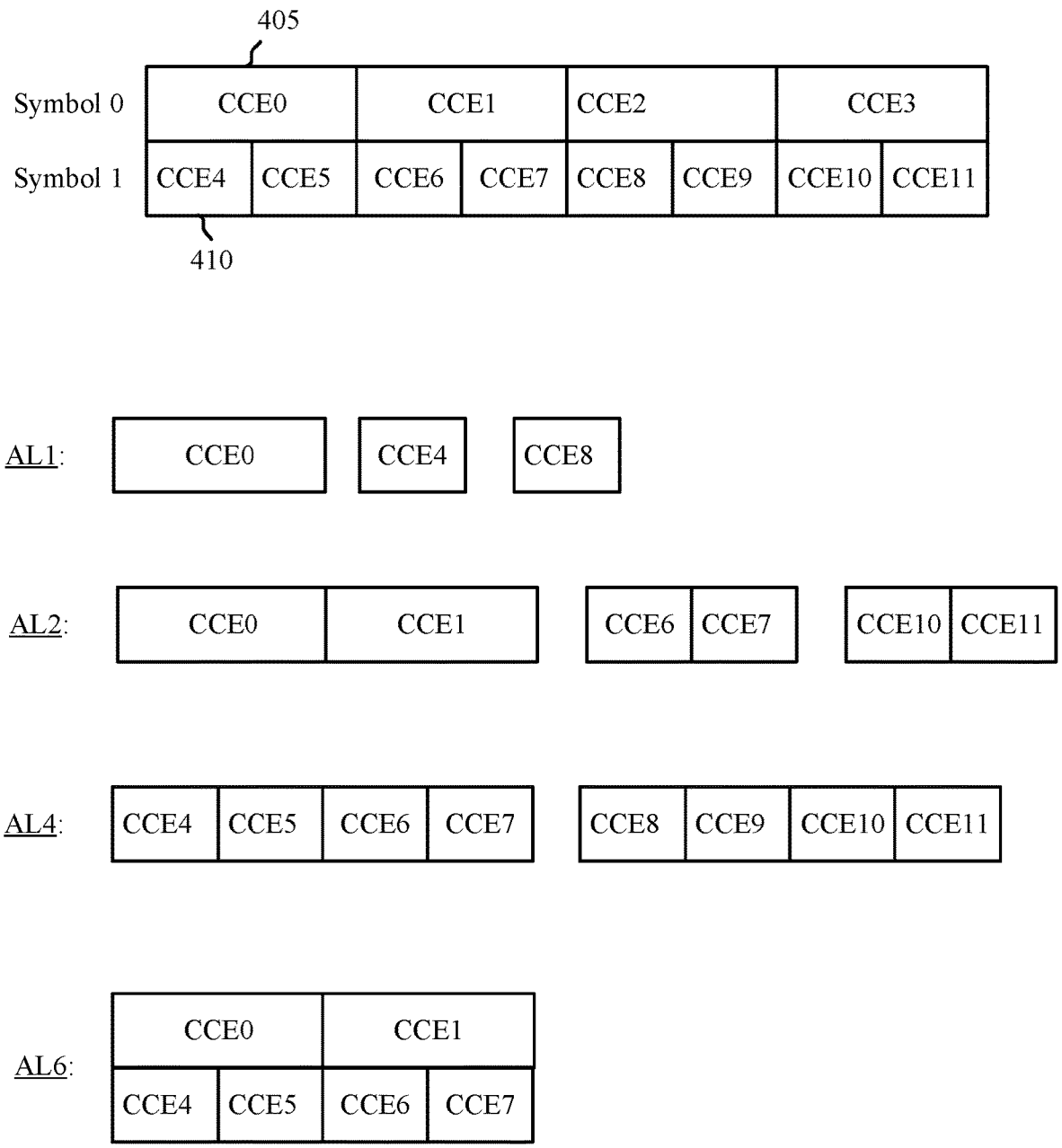
FIG. 4 illustrates an example of a cross-symbol configuration that supports search space design and use in accordance with aspects of the present disclosure.

FIG. 4 illustrates an example of a cross-symbol configuration 400 for search space design and use, in accordance with aspects of the present disclosure. Configuration 400 may implement one or more aspects of wireless communication system 100 and/or process flow 200 of FIGS. 1 and 2. Aspects of configuration 400 may be implemented by a UE and/or a base station, which may be examples of the corresponding devices described herein. Aspects of configuration 400 may be combined with aspects of configuration 300 of FIG. 3.

Broadly, configuration 400 illustrates one example of a cross-symbol configuration of a cross-coreset configuration for different ALs. For example, configuration 400 may include a control channel subframe or wireless communications structure transmitted during different symbols (identified as symbol 0 and 1). Each symbol may refer to an OFDM symbol. Each symbol may include one or more CCEs, where different CCEs may have different sizes. For example, a CCE 405 may have a different size with respect to CCE 410. For example, CCEs 405 in symbol 0 may have a different size than CCEs 410 in symbol 1. As discussed above, the difference in size between the CCEs may be attributable to the amount of coded information used to convey the DCI message, based on a RS density, and the like. It is to be understood that each symbol may include more or less than the illustrated CCEs.

In one example, a cross-symbol configuration may be associated with an AL of 1, e.g., one CCE may be used to convey the DCI message. In the example configuration 400, the cross-symbol configuration may include using CCE 0 during symbol 0 and CCEs 4 and 8 during second symbol 1. For example, CCE 0 during the first symbol 0 may be used to convey a first indication of the DCI message. Then, one or more of CCEs 4 or 8 during the second symbol 1 may be used to convey duplicates of the DCI message. Thus, the DCI message may span across different symbols.

In one example, a cross-symbol configuration may be associated with an AL of 2, e.g., two CCEs may be or are used to convey the DCI message. In the example configuration 400, the cross-symbol configuration may include using CCEs 0/1 during the first symbol 0 and CCEs 6/7 and 10/11 during the second symbol 1 to convey the DCI message. For example, CCEs 0/1 during the first symbol may include or be used to convey a first indication of the DCI message. Then, one or more of CCEs 6/7 and/or 10/11 during the second symbol may include or be used to convey duplicates of the DCI message.

In one example, a cross-symbol configuration may be associated with an AL of 4, e.g., four CCEs may include or be used to convey the DCI message. In the example configuration 400, the cross-symbol configuration may include using CCEs 4-7 during the second symbol 1 to convey the DCI message. For example, CCEs 4-7 during the second symbol may be used to convey a first indication of the DCI message. Then, CCEs 8-11 during the second symbol 0 may be used to convey duplicates of the DCI message.

In one example, a cross-symbol configuration may be associated with an AL of 6, e.g., 6 CCEs may be used to convey the DCI message. In the example configuration 400, the cross-symbol configuration may include using CCEs 0/1 during the first symbol 0 and CCEs 4-7 during the second symbol 1 to convey the DCI message. Duplicates of the DCI message may then be conveyed during different symbols, using different control channel subbands, and the like. In aspects, an AL, such as AL 6, having a CCE of a different size that one or more other CCEs in the AL may be employed to accommodate a reference signal transmission.

It is to be understood that the cross-symbol channel configuration illustrated in configuration 400 is provided by example only and is not limited to the illustrated configuration. For example, different CCEs may be selected for the different ALs.

FIG. 5 illustrates an example of a cross-beam configuration 500 for search space design and use, in accordance with aspects of the present disclosure. Configuration 500 may implement one or more aspects of wireless communication system 100 and/or process flow 200 of FIGS. 1 and 2. Aspects of configuration 500 may be implemented by a UE and/or a base station, which may be examples of the corresponding devices described herein. Aspects of configuration 500 may be combined with aspects of configurations 300 and/or 400 of FIGS. 3 and 4.

Broadly, configuration 500 illustrates one example of a cross-beam configuration of a cross-coreset configuration for different ALs. For example, configuration 500 may include a control channel subframe or wireless communications structure transmitted on different beams (identified as beams 0 and 1). Each beam may include a plurality of CCEs 505. It is to be understood that each beam may include more or less than the illustrated CCEs 505.

In one example, a cross-beam configuration may be associated with an AL of 8, e.g., eight CCEs 505 may be used to convey the DCI message. In the example configuration 500, the cross-beam configuration may include using CCEs 4-7 of beam 0 and CCEs 0-3 of beam 1 to convey the DCI message. For example, CCEs 4-7 of beam 0 and CCEs 0-3 of beam 1 may be used to convey a first indication of the DCI message. Then, other CCEs during the same beam and/or different beams may be used to convey duplicate (if desired) indications of the DCI message.

In another example with an AL of 8, e.g., eight CCEs 505 may be used to convey the DCI message, the cross-beam configuration may include using CCEs 0-7 of beam 0 and/or CCEs 0-7 of beam 1 to convey the DCI message. For example, CCEs 0-7 of beam 0 may be used to convey a first indication of the DCI message. Then, CCEs 0-7 of beam 1 may be used to convey a duplicate of the DCI message.

In one example, a cross-beam configuration may be associated with an AL of 16, e.g., 16 CCEs 505 may be used to convey the DCI message. In the example configuration 500, the cross-beam configuration may include using CCEs 0-7 of beam 0 and CCEs 0-7 of beam 1 to convey a first indication of the DCI message. Duplicates of the DCI message may be conveyed using different beams and/or during different symbols.

It is to be understood that the cross-beam configuration illustrated in configuration 500 is provided by example only and is not limited to the illustrated configurations. For example, different CCEs may be selected for the different ALs.

Figure 6:
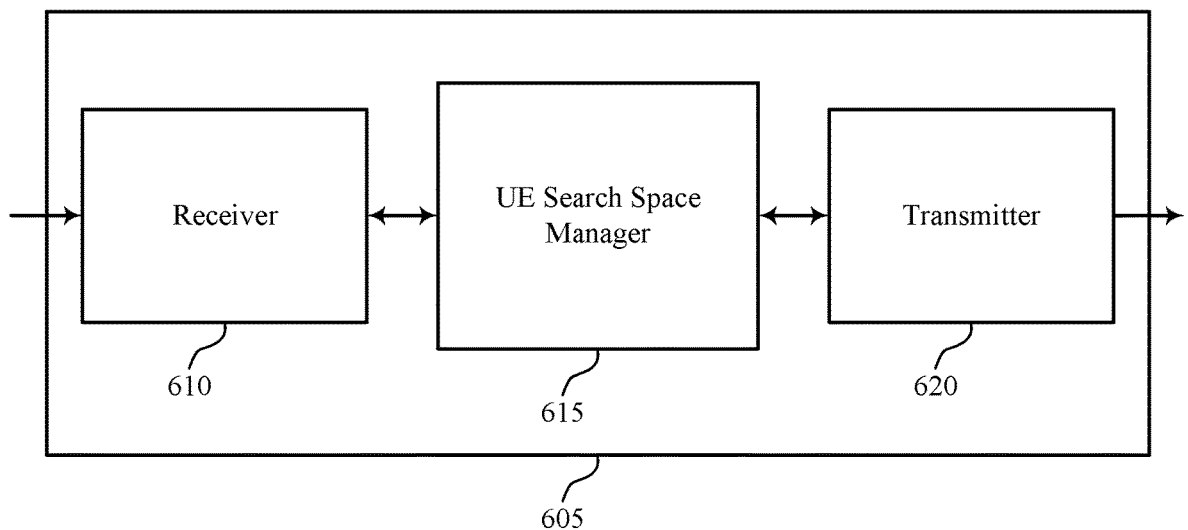
FIGS. 6 through 8 show block diagrams of a device that supports search space design and use in accordance with aspects of the present disclosure.

FIG. 6 shows a block diagram 600 of a wireless device 605 that supports search space design and use in accordance with various aspects of the present disclosure. Wireless device 605 may be an example of aspects of a UE 115 as described with reference to FIG. 1. Wireless device 605 may include receiver 610, UE search space manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to search space design and use, etc.). Information may be passed on to other components of the device. The receiver 610 may be an example of aspects of the transceiver 935 described with reference to FIG. 9.

UE search space manager 615 may be an example of aspects of the UE search space manager 915 described with reference to FIG. 9.

UE search space manager 615 may monitor, according to a search space configuration, one or more groups of one or more control channel elements (CCEs) to detect one or more DCI messages, where the search space configuration includes a cross-coreset configuration, such as a cross-control channel subband configuration or a cross-symbol configuration and decode, based on the monitoring, at least one DCI message of the one or more DCI messages.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
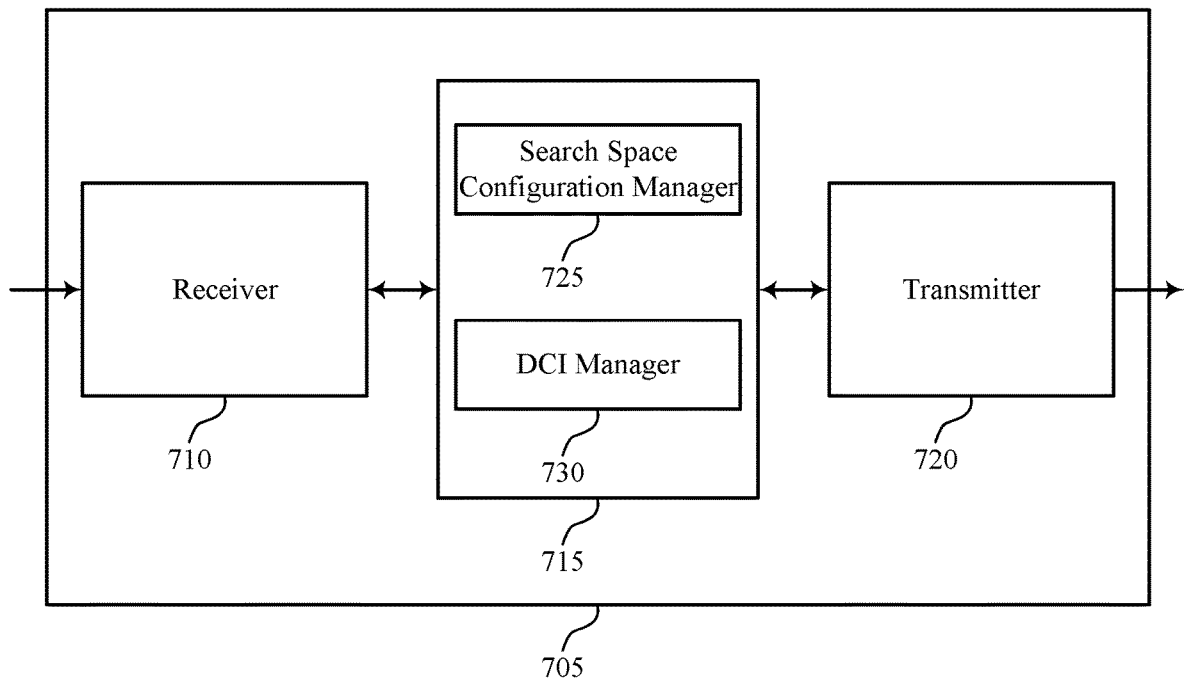

FIG. 7 shows a block diagram 700 of a wireless device 705 that supports search space design and use in accordance with various aspects of the present disclosure. Wireless device 705 may be an example of aspects of a wireless device 605 or a UE 115 as described with reference to FIGS. 1 and 6. Wireless device 705 may include receiver 710, UE search space manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to search space design and use, etc.). Information may be passed on to other components of the device. The receiver 710 may be an example of aspects of the transceiver 935 described with reference to FIG. 9.

UE search space manager 715 may be an example of aspects of the UE search space manager 915 described with reference to FIG. 9.

UE search space manager 715 may also include search space configuration manager 725 and DCI manager 730.

Search space configuration manager 725 may monitor, according to a search space configuration, one or more groups of one or more CCEs to detect one or more DCI messages, where the search space configuration includes a cross-coreset configuration, such as a cross-control channel subband configuration or a cross-symbol configuration and identify, based on the search space configuration, an aggregation level associated with the one or more groups of one or more CCEs. In some cases, the one or more groups of one or more CCEs includes at least one of the at least one DCI message repeated on a set of CCEs on different control channel subbands or the at least one DCI message spread across a set of CCEs on different control channel subbands. In some cases, the one or more groups of one or more CCEs includes at least one of the at least one DCI message repeated on a set of CCEs during different symbols or the at least one DCI message spread across a set of CCEs during different symbols. In some cases, the control channel subband is associated with a subband bandwidth including a set of tones.

DCI manager 730 may decode, based on the monitoring, at least one DCI message of the one or more DCI messages.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
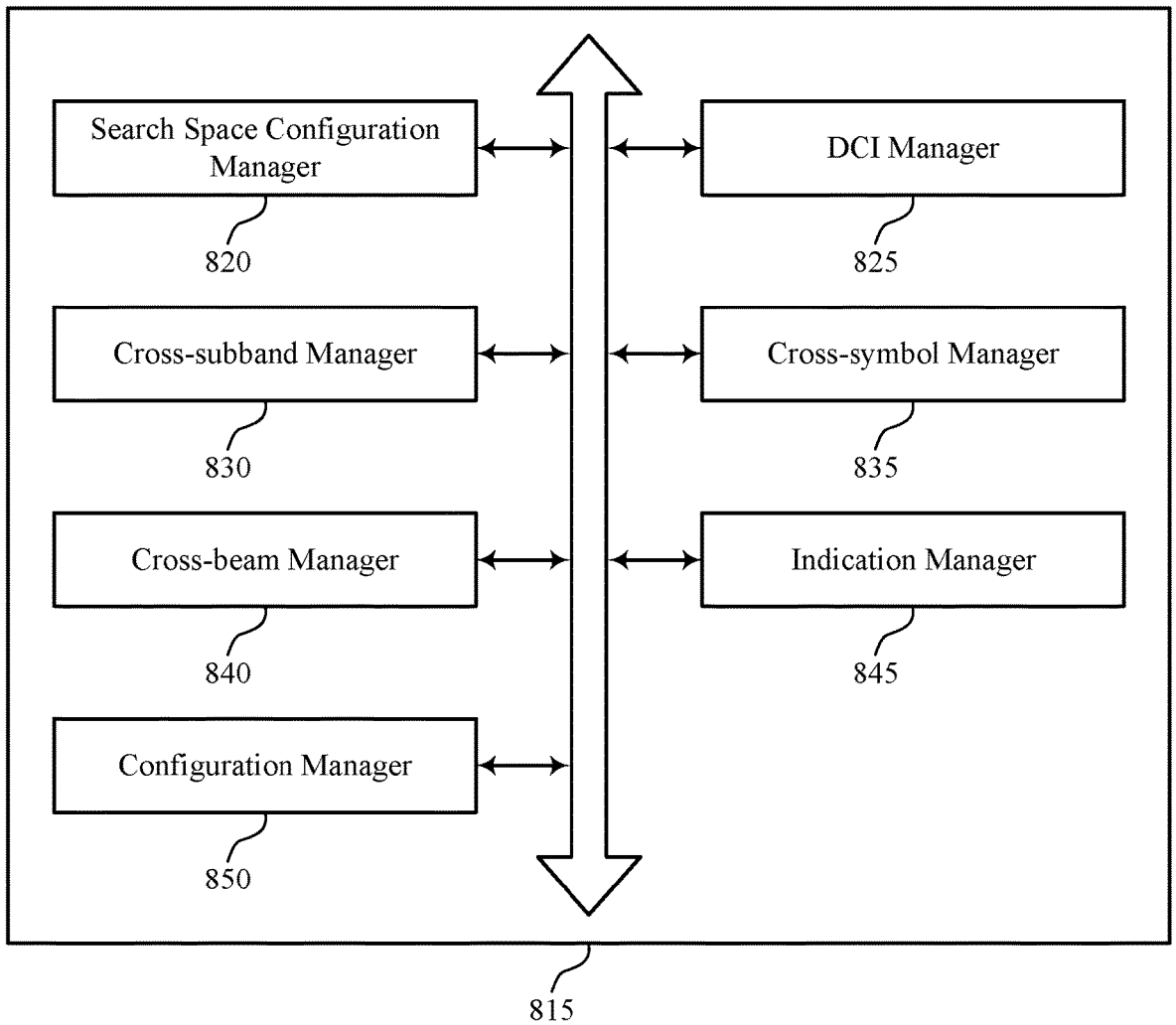

FIG. 8 shows a block diagram 800 of a UE search space manager 815 that supports search space design and use in accordance with various aspects of the present disclosure. The UE search space manager 815 may be an example of aspects of a UE search space manager 615, a UE search space manager 715, or a UE search space manager 915 described with reference to FIGS. 6, 7, and 9. The UE search space manager 815 may include search space configuration manager 820, DCI manager 825, cross-subband manager 830, cross-symbol manager 835, cross-beam manager 840, indication manager 845, and configuration manager 850. Each of these modules may communicate, directly or indirectly, with one another (e.g., via one or more buses).

Search space configuration manager 820 may monitor, according to a search space configuration, one or more groups of one or more CCEs to detect one or more DCI messages, where the search space configuration includes a cross-coreset configuration, such as a cross-control channel subband configuration or a cross-symbol configuration and identify, based on the search space configuration, an aggregation level associated with the one or more groups of one or more CCEs. In some cases, the one or more groups of one or more CCEs includes at least one of the at least one DCI message repeated on a set of CCEs on different control channel subbands or the at least one DCI message spread across a set of CCEs on different control channel subbands. In some cases, the one or more groups of one or more CCEs includes at least one of the at least one DCI message repeated on a set of CCEs during different symbols or the at least one DCI message spread across a set of CCEs during different symbols. In some cases, the control channel subband is associated with a subband bandwidth including a set of tones.

DCI manager 825 may decode, based on the monitoring, at least one DCI message of the one or more DCI messages.

Cross-subband manager 830 may monitor, based on the cross-control channel subband configuration of the cross-coreset configuration, the one or more groups of one or more CCEs on at least two control channel subbands to detect the at least one DCI message.

Cross-symbol manager 835 may monitor, based on the cross-symbol configuration of the cross-coreset configuration, the one or more groups of one or more CCEs during at least two symbols to detect the at least one DCI message.

Cross-beam manager 840 may monitor, based on a cross-beam configuration of the cross-coreset configuration, the one or more groups of one or more CCEs on at least two beamformed signals to detect the at least one DCI message.

Indication manager 845 may receive an enabling indication of the search space configuration. In some cases, the enabling indication is received in at least one of a SIB message, or a MIB message, or a MSIB message.

Configuration manager 850 may receive a configuration message associated with the search space configuration. In some cases, the configuration message is received in a RRC message.

Figure 9:
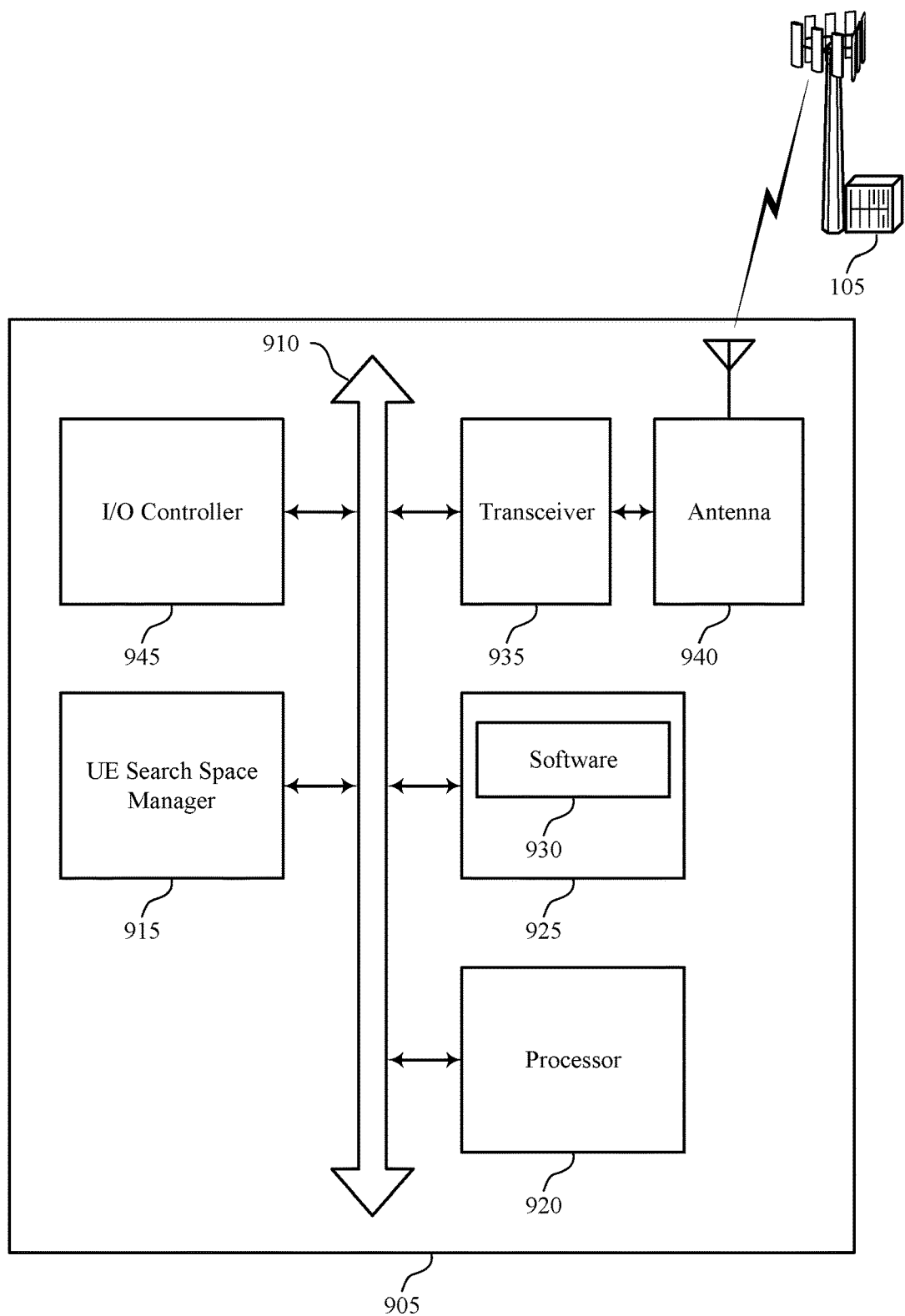
FIG. 9 illustrates a block diagram of a system including a user equipment (UE) that supports search space design and use in accordance with aspects of the present disclosure.

FIG. 9 shows a diagram of a system 900 including a device 905 that supports search space design and use in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE search space manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting search space design and use).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support search space design and use. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
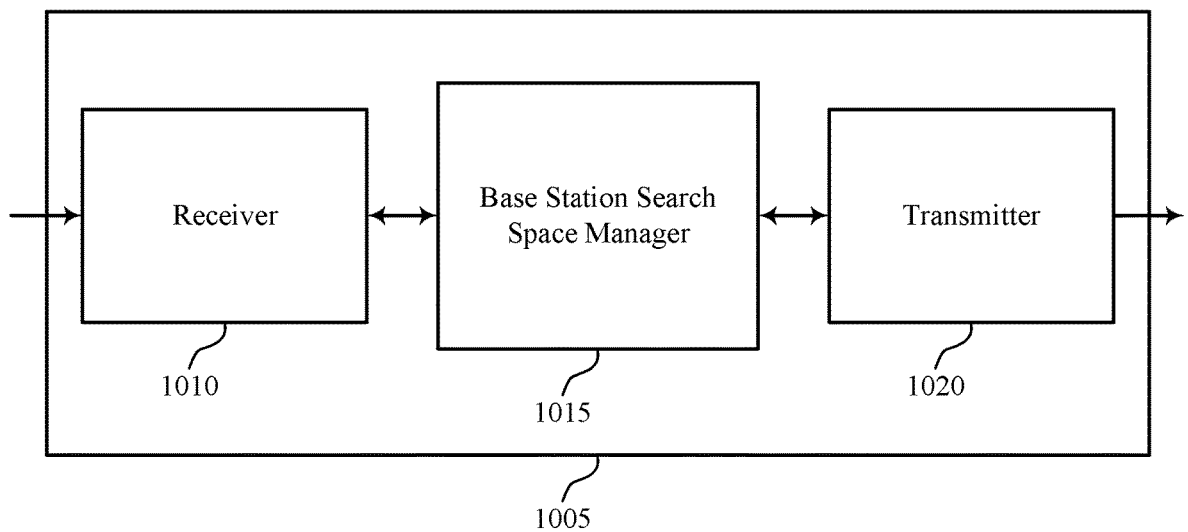
FIGS. 10 through 12 show block diagrams of a device that supports search space design and use in accordance with aspects of the present disclosure.

FIG. 10 shows a block diagram 1000 of a wireless device 1005 that supports search space design and use in accordance with various aspects of the present disclosure. Wireless device 1005 may be an example of aspects of a network access device 105 as described with reference to FIG. 1.

Wireless device 1005 may include receiver 1010, base station search space manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to search space design and use, etc.). Information may be passed on to other components of the device. The receiver 1010 may be an example of aspects of the transceiver 1335 described with reference to FIG. 13.

Base station search space manager 1015 may be an example of aspects of the base station search space manager 1315 described with reference to FIG. 13.

Base station search space manager 1015 may select a search space configuration for transmission of one or more groups of one or more CCEs to convey a DCI message, where the search space configuration includes a cross-coreset configuration, such as a cross-control channel subband configuration or a cross-symbol configuration and transmit, based on the monitoring, the DCI message.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
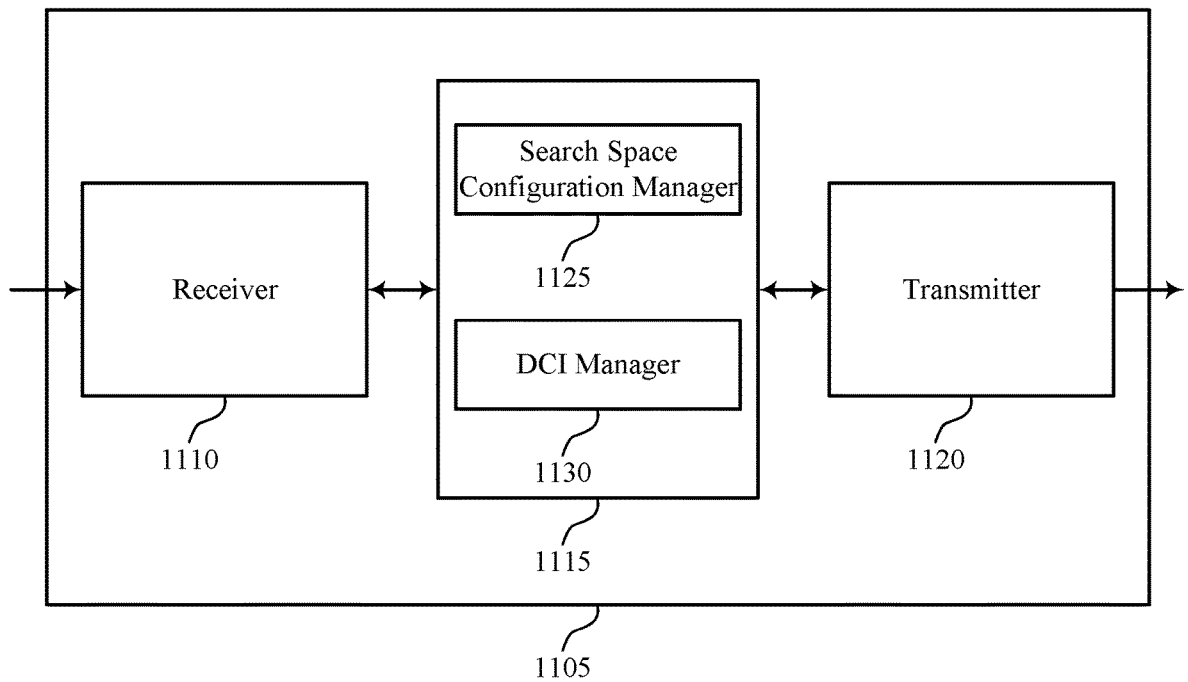

FIG. 11 shows a block diagram 1100 of a wireless device 1105 that supports search space design and use in accordance with various aspects of the present disclosure. Wireless device 1105 may be an example of aspects of a wireless device 1005 or a network access device 105 as described with reference to FIGS. 1 and 10. Wireless device 1105 may include receiver 1110, base station search space manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to search space design and use, etc.). Information may be passed on to other components of the device. The receiver 1110 may be an example of aspects of the transceiver 1335 described with reference to FIG. 13.

Base station search space manager 1115 may be an example of aspects of the base station search space manager 1315 described with reference to FIG. 13.

Base station search space manager 1115 may also include search space configuration manager 1125 and DCI manager 1130.

Search space configuration manager 1125 may select a search space configuration for transmission of one or more groups of one or more CCEs to convey a DCI message, where the search space configuration includes a cross-coreset configuration, such as a cross-control channel subband configuration or a cross-symbol configuration and select, based on the search space configuration, an aggregation level associated with the one or more groups of one or more CCEs. In some cases, the control channel subband is associated with a subband bandwidth including a set of tones.

DCI manager 1130 may transmit, based on the monitoring, the DCI message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
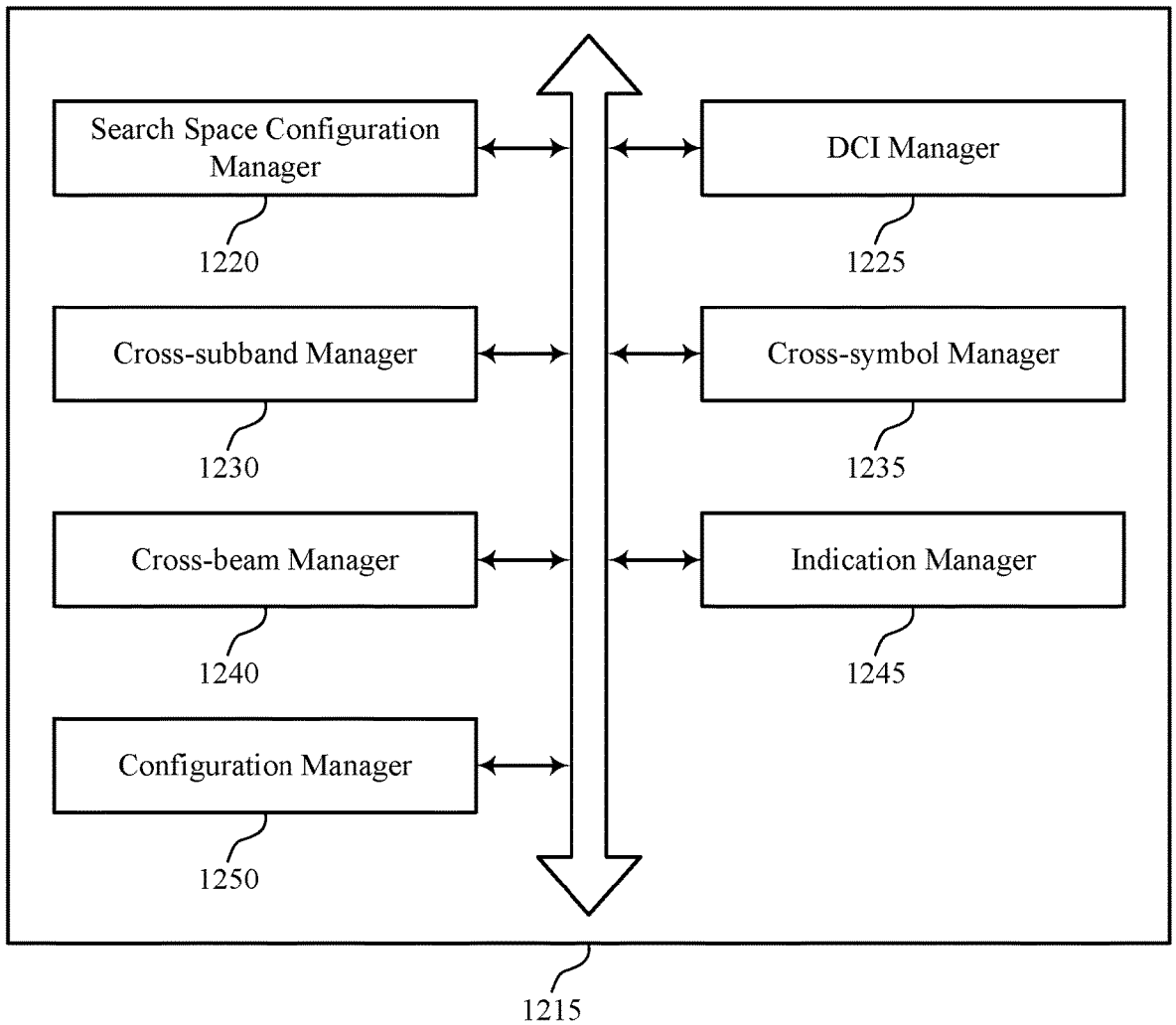

FIG. 12 shows a block diagram 1200 of a base station search space manager 1215 that supports search space design and use in accordance with various aspects of the present disclosure. The base station search space manager 1215 may be an example of aspects of a base station search space manager 1315 described with reference to FIGS. 10, 11, and 13. The base station search space manager 1215 may include search space configuration manager 1220, DCI manager 1225, cross-subband manager 1230, cross-symbol manager 1235, cross-beam manager 1240, indication manager 1245, and configuration manager 1250. Each of these modules may communicate, directly or indirectly, with one another (e.g., via one or more buses).

Search space configuration manager 1220 may select a search space configuration for transmission of one or more groups of one or more CCEs to convey a DCI message, where the search space configuration includes a cross-coreset configuration, such as a cross-control channel subband configuration or a cross-symbol configuration and select, based on the search space configuration, an aggregation level associated with the one or more groups of one or more CCEs. In some cases, the control channel subband is associated with a subband bandwidth including a set of tones.

DCI manager 1225 may transmit, based on the monitoring, the DCI message.

Cross-subband manager 1230 may transmit, based on the cross-control channel subband configuration of the cross-coreset configuration, the one or more groups of one or more CCEs on at least two control channel subbands to convey the DCI message. In some cases, the one or more groups of one or more CCEs includes at least one of the DCI message repeated on a set of CCEs on different control channel subbands or the DCI message spread across a set of CCEs on different control channel subbands.

Cross-symbol manager 1235 may transmit, based on the cross-symbol configuration of the cross-coreset configuration, the one or more groups of one or more CCEs during at least two symbols to convey the DCI message. In some cases, the one or more groups of one or more CCEs includes at least one of the DCI message repeated on a set of CCEs during different symbols or the DCI message spread across a set of CCEs during different symbols.

Cross-beam manager 1240 may transmit, based on a cross-beam configuration of the cross-coreset configuration, the one or more groups of one or more CCEs on at least two beamformed signals to convey the at least one DCI message.

Indication manager 1245 may transmit an enabling indication of the search space configuration. In some cases, the enabling indication is transmitted in at least one of a SIB message, or a MIB message, or a MSIB message.

Configuration manager 1250 may transmit a configuration message associated with the search space configuration. In some cases, the configuration message is transmitted in a RRC message.

Figure 13:
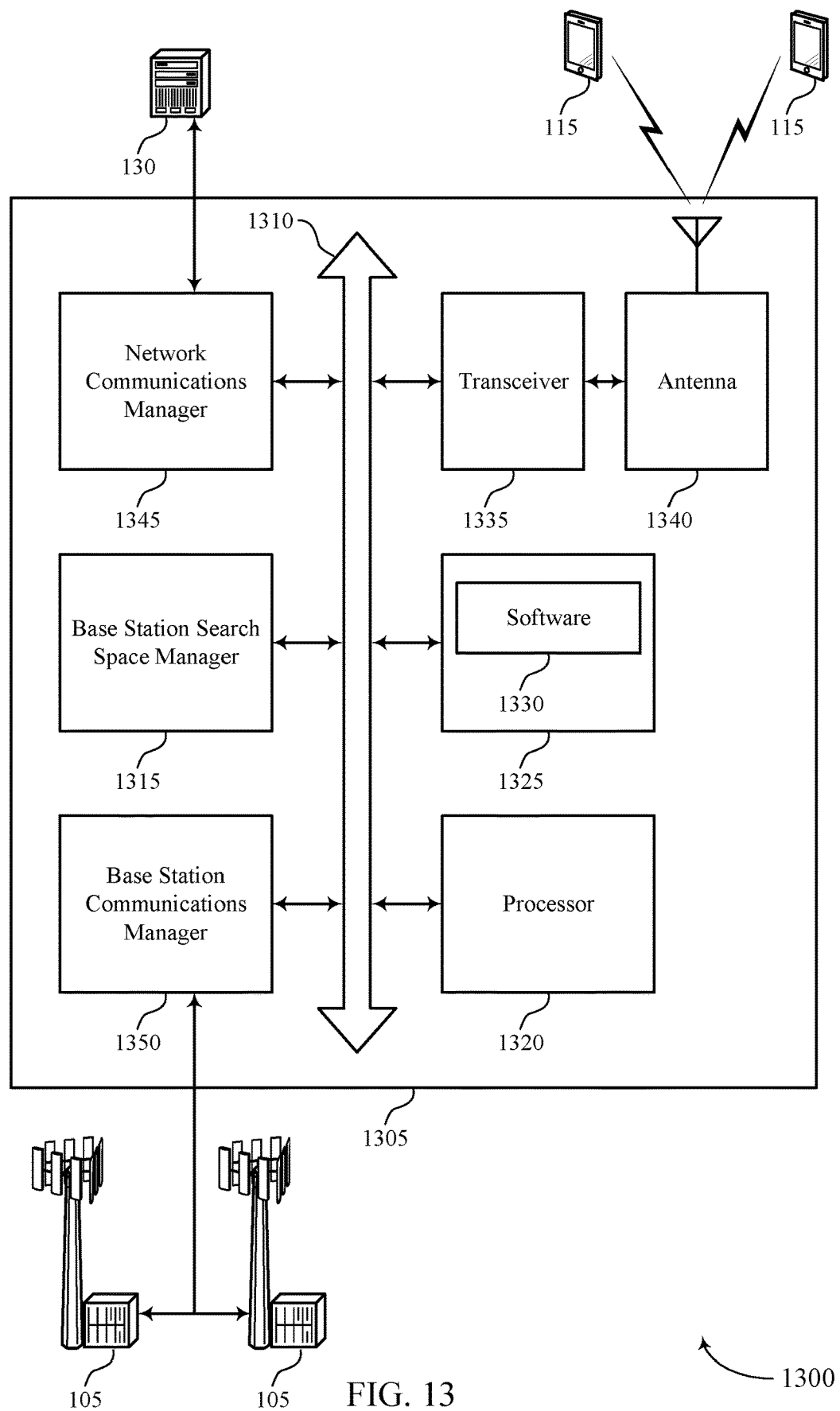
FIG. 13 illustrates a block diagram of a system including a base station that supports search space design and use in accordance with aspects of the present disclosure.

FIG. 13 shows a diagram of a system 1300 including a device 1305 that supports search space design and use in accordance with various aspects of the present disclosure. Device 1305 may be an example of or include the components of network access device 105 as described above, e.g., with reference to FIG. 1. Device 1305 may include components for bi-directional voice and data communications including components for transmitting and receiving communications, including base station search space manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting search space design and use).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support search space design and use. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other network access device 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an Long Term Evolution (LTE)/LTE-A wireless communication network technology to provide communication between base stations 105.

Figure 14:
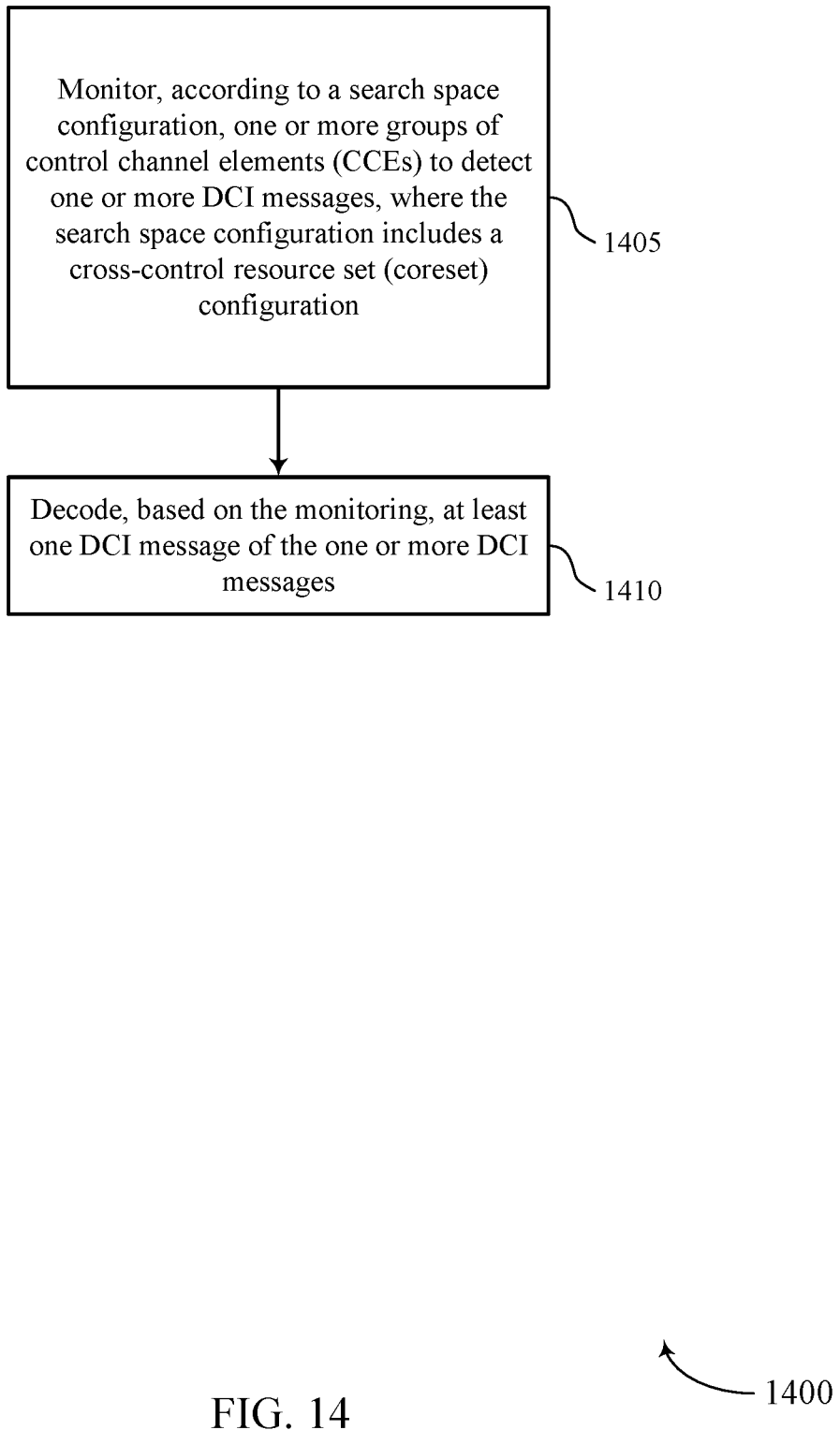
FIGS. 14 through 17 illustrate methods for search space design and use in accordance with aspects of the present disclosure.

FIG. 14 shows a flowchart illustrating a method 1400 for search space design and use in accordance with various aspects of the present disclosure. The operations of method 1400 may be implemented by a UE 115 or its components as described herein. For example, the operations of method 1400 may be performed by a UE search space manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1405 the UE 115 may monitor, according to a search space configuration, one or more groups of one or more CCEs to detect one or more DCI messages, wherein the search space configuration comprises a cross-coreset configuration, such as a cross-control channel subband configuration or a cross-symbol configuration. The operations of block 1405 may be performed according to the methods described with reference to FIGS. 1 through 5. In certain examples, aspects of the operations of block 1405 may be performed by a search space configuration manager as described with reference to FIGS. 6 through 9.

At block 1410 the UE 115 may decode, based at least in part on the monitoring, at least one DCI message of the one or more DCI messages. The operations of block 1410 may be performed according to the methods described with reference to FIGS. 1 through 5. In certain examples, aspects of the operations of block 1410 may be performed by a DCI manager as described with reference to FIGS. 6 through 9.

Figure 15:
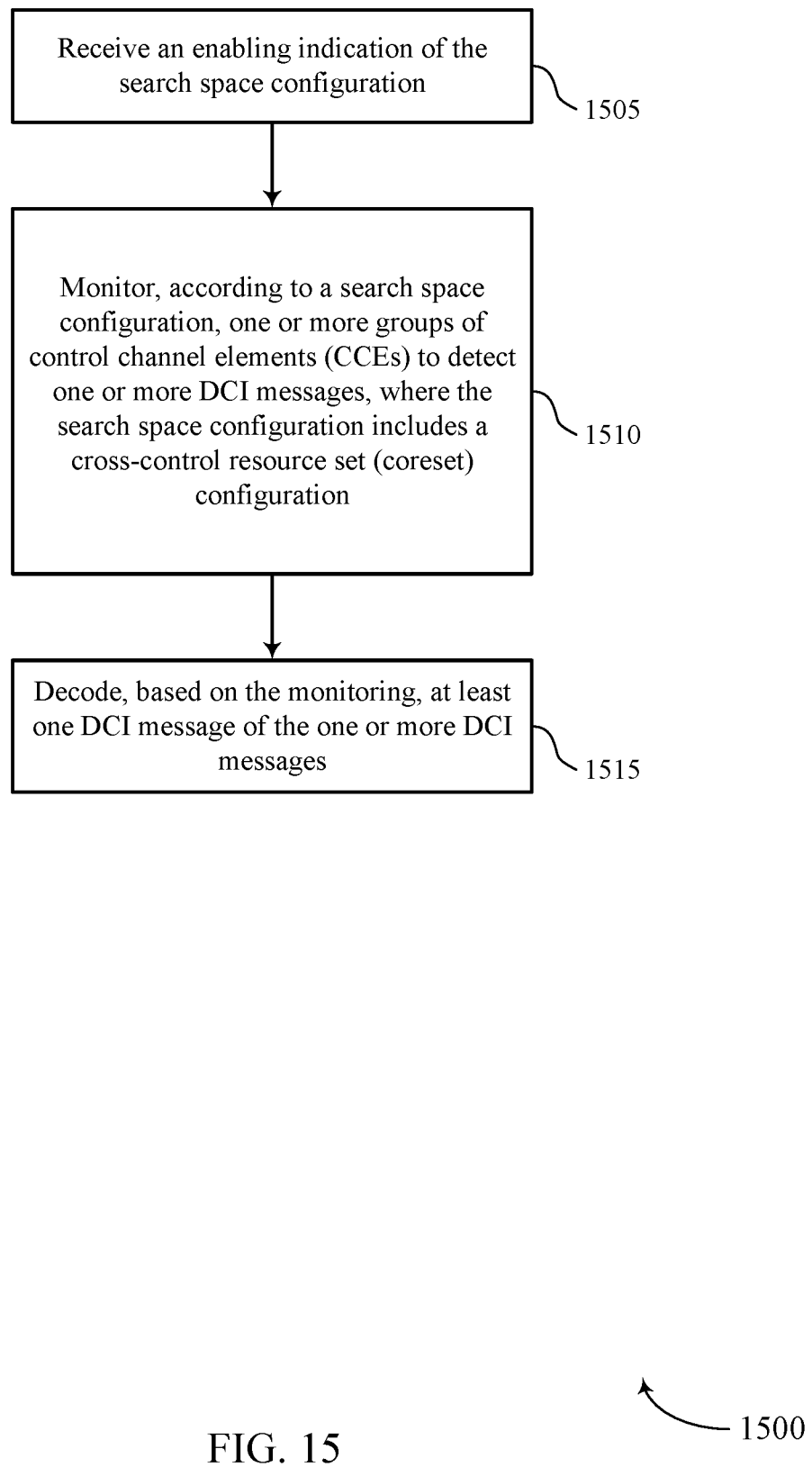

FIG. 15 shows a flowchart illustrating a method 1500 for search space design and use in accordance with various aspects of the present disclosure. The operations of method 1500 may be implemented by a UE 115 or its components as described herein. For example, the operations of method 1500 may be performed by a UE search space manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may receive an enabling indication of the search space configuration. The operations of block 1505 may be performed according to the methods described with reference to FIGS. 1 through 5. In certain examples, aspects of the operations of block 1505 may be performed by a indication manager as described with reference to FIGS. 6 through 9.

At block 1510 the UE 115 may monitor, according to a search space configuration, one or more groups of one or more CCEs to detect one or more DCI messages, wherein the search space configuration comprises a cross-coreset configuration, such as a cross-control channel subband configuration or a cross-symbol configuration. The operations of block 1510 may be performed according to the methods described with reference to FIGS. 1 through 5. In certain examples, aspects of the operations of block 1510 may be performed by a search space configuration manager as described with reference to FIGS. 6 through 9.

At block 1515 the UE 115 may decode, based at least in part on the monitoring, at least one DCI message of the one or more DCI messages. The operations of block 1515 may be performed according to the methods described with reference to FIGS. 1 through 5. In certain examples, aspects of the operations of block 1515 may be performed by a DCI manager as described with reference to FIGS. 6 through 9.

Figure 16:
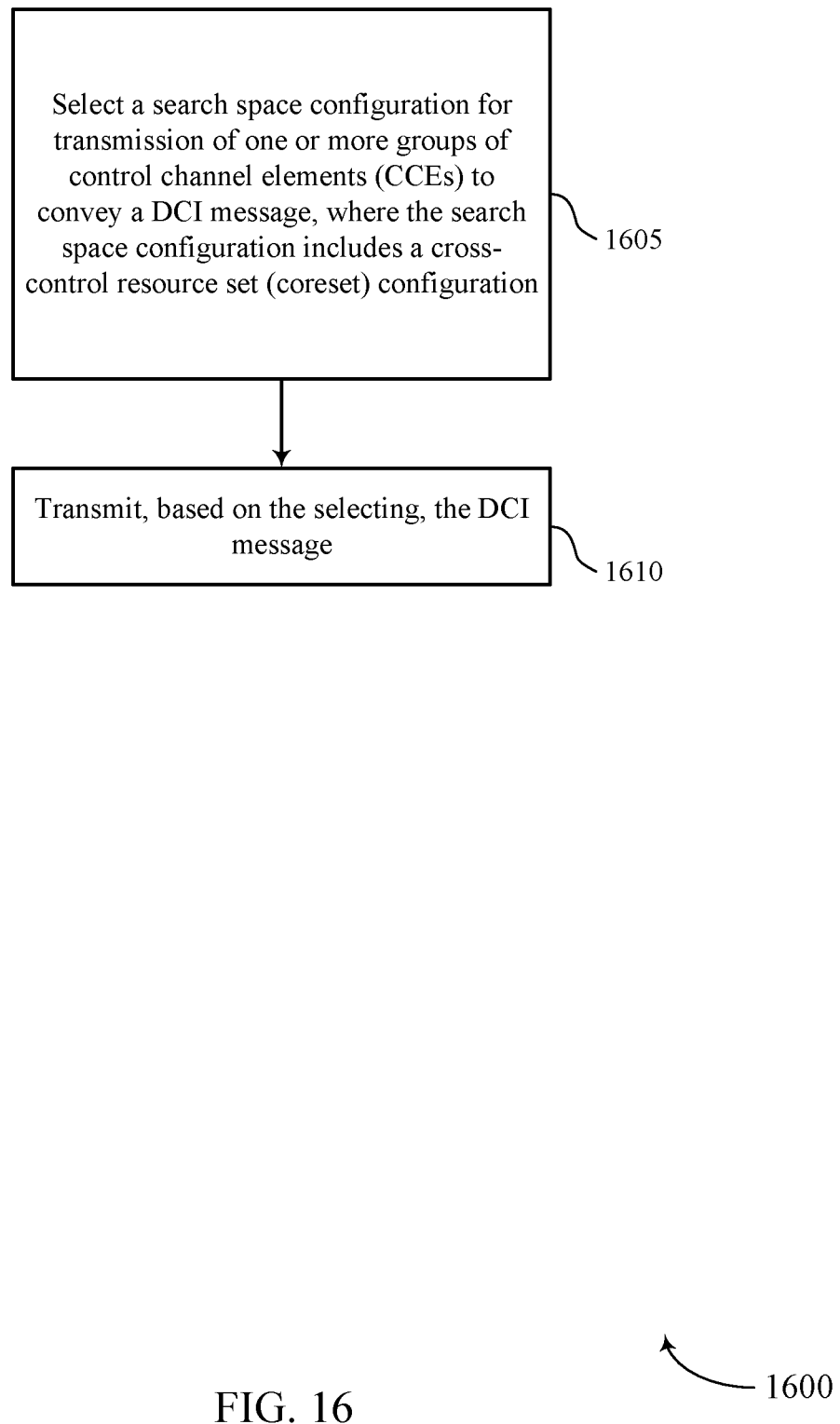

FIG. 16 shows a flowchart illustrating a method 1600 for search space design and use in accordance with various aspects of the present disclosure. The operations of method 1600 may be implemented by a network access device 105 or its components as described herein. For example, the operations of method 1600 may be performed by a base station search space manager as described with reference to FIGS. 10 through 13. In some examples, a network access device 105 may execute a set of codes to control the functional elements of the device to perform the functions described below. Additionally or alternatively, the network access device 105 may perform aspects the functions described below using special-purpose hardware.

At block 1605 the network access device 105 may select a search space configuration for transmission of one or more groups of one or more CCEs to convey a DCI message, wherein the search space configuration comprises a cross-coreset configuration, such as a cross-control channel subband configuration or a cross-symbol configuration. The operations of block 1605 may be performed according to the methods described with reference to FIGS. 1 through 5. In certain examples, aspects of the operations of block 1605 may be performed by a search space configuration manager as described with reference to FIGS. 10 through 13.

At block 1610 the network access device 105 may transmit, based at least in part on the selecting, the DCI message. The operations of block 1610 may be performed according to the methods described with reference to FIGS. 1 through 5. In certain examples, aspects of the operations of block 1610 may be performed by a DCI manager as described with reference to FIGS. 10 through 13.

Figure 17:
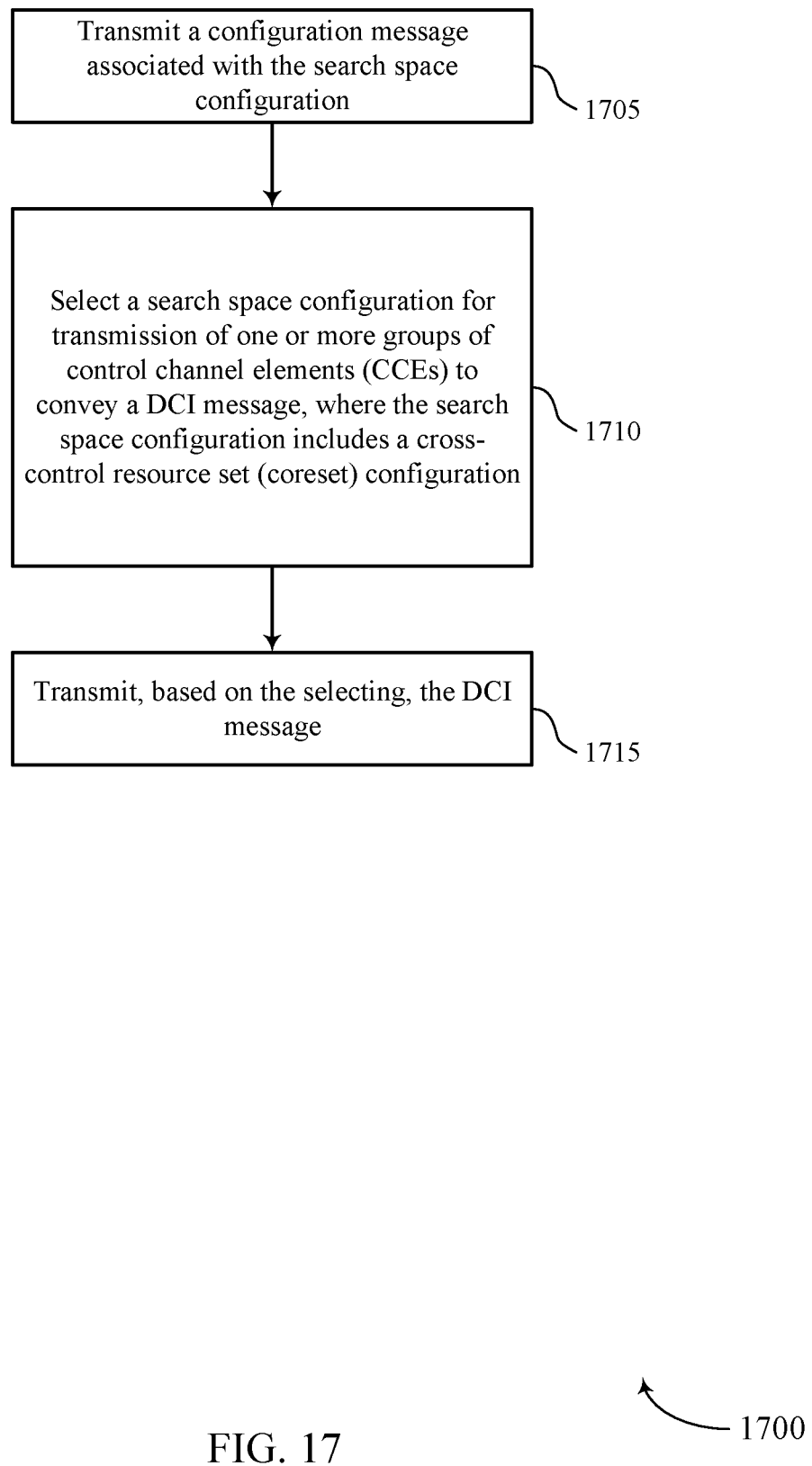

FIG. 17 shows a flowchart illustrating a method 1700 for search space design and use in accordance with various aspects of the present disclosure. The operations of method 1700 may be implemented by a network access device 105 or its components as described herein. For example, the operations of method 1700 may be performed by a base station search space manager as described with reference to FIGS. 10 through 13. In some examples, a network access device 105 may execute a set of codes to control the functional elements of the device to perform the functions described below. Additionally or alternatively, the network access device 105 may perform aspects the functions described below using special-purpose hardware.

At block 1705 the network access device 105 may transmit a configuration message associated with the search space configuration. The operations of block 1705 may be performed according to the methods described with reference to FIGS. 1 through 5. In certain examples, aspects of the operations of block 1705 may be performed by a configuration manager as described with reference to FIGS. 10 through 13.

At block 1710 the network access device 105 may select a search space configuration for transmission of one or more groups of one or more CCEs to convey a DCI message, wherein the search space configuration comprises a cross-coreset configuration, such as a cross-control channel subband configuration or a cross-symbol configuration. The operations of block 1710 may be performed according to the methods described with reference to FIGS. 1 through 5. In certain examples, aspects of the operations of block 1710 may be performed by a search space configuration manager as described with reference to FIGS. 10 through 13.

At block 1715 the network access device 105 may transmit, based at least in part on the selecting, the DCI message. The operations of block 1715 may be performed according to the methods described with reference to FIGS. 1 through 5. In certain examples, aspects of the operations of block 1715 may be performed by a DCI manager as described with reference to FIGS. 10 through 13.

In this manner, the present methods and apparatus for search space design and use may provide improved and/or guaranteed coverage to UEs, even UEs at a cell edges, by improving resources for communication of messages, such as a DCI message. It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, in wireless communications system 100 and process flow 200 of FIGS. 1 and 2, respectively—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
    monitoring, according to a search space configuration, a plurality of control channel elements (CCEs) of a subframe to detect a downlink control information (DCI) message for use by the wireless device, wherein the search space configuration comprises a first CCE carrying a first portion of the DCI message in a first symbol of the subframe and a second CCE carrying a second portion of the DCI message in a second symbol of the subframe; and
    decoding, based at least in part on the monitoring, the DCI message.

2. The method of claim 1, further comprising:
    receiving an enabling indication of the search space configuration.

3. The method of claim 2, wherein:
    the enabling indication is received in at least one of a system information block (SIB) message, or a master information block (MIB) message, or a minimal system information block (MSIB) message.

4. The method of claim 1, further comprising:
    receiving a configuration message associated with the search space configuration.

5. The method of claim 4, wherein:
    the configuration message is received in a radio resource control (RRC) message.

6. The method of claim 1, further comprising:
    identifying, based at least in part on the search space configuration, an aggregation level associated with the plurality of CCEs.

7. The method of claim 1, wherein:
    the DCI message is repeated on the plurality of CCEs during different symbols, or
    the DCI message is spread across the plurality of CCEs during different symbols.

8. A method for wireless communication, comprising:
    selecting a search space configuration for transmission of a plurality of control channel elements (CCEs) to convey a downlink control information (DCI) message of a subframe, wherein the search space configuration comprises a first CCE carrying a first portion of the DCI message in a first symbol of the subframe and a second CCE carrying a second portion of the DCI message in a second symbol of the subframe; and
    transmitting, based at least in part on the selecting, the DCI message.

9. The method of claim 8, further comprising:
    transmitting, based at least in part on the search space configuration, the plurality of CCEs during at least two symbols of a plurality of symbols used to convey the DCI message.

10. The method of claim 8, further comprising:
    transmitting an enabling indication of the search space configuration.

11. The method of claim 10, wherein:
    the enabling indication is transmitted in at least one of a system information block (SIB) message, or a master information block (MIB) message, or a minimal system information block (MSIB) message.

12. The method of claim 8, further comprising:
    transmitting a configuration message associated with the search space configuration.

13. The method of claim 12, wherein:
    the configuration message is transmitted in a radio resource control (RRC) message.

14. The method of claim 8, further comprising:
    selecting, based at least in part on the search space configuration, an aggregation level associated with the plurality of CCEs.

15. The method of claim 8, wherein:
    the DCI message is repeated on the plurality of CCEs during different symbols, or
    the DCI message is spread across the plurality of CCEs during different symbols.

16. An apparatus for wireless communication, in a system comprising:
    a processor;
    memory in electronic communication with the processor; and
    instructions stored in the memory and operable, when executed by the processor, to cause the apparatus to:
        monitor, according to a search space configuration, a plurality of control channel elements (CCEs) of a subframe to detect a downlink control information (DCI) message for use by the apparatus, wherein the search space configuration comprises a first CCE carrying a first portion of the DCI message in a first symbol of the subframe and a second CCE carrying a second portion of the DCI message in a second symbol of the subframe; and
        decode, based at least in part on the monitoring, the DCI message.

17. The apparatus of claim 16, wherein the instructions are further executable by the processor to cause the apparatus to:
    receive an enabling indication of the search space configuration.

18. The apparatus of claim 17, wherein the enabling indication is received in at least one of a system information block (SIB) message, or a master information block (MIB) message, or a minimal system information block (MSIB) message.

19. An apparatus for wireless communication, in a system comprising:
- a processor;
- memory in electronic communication with the processor; and
- instructions stored in the memory and operable, when executed by the processor, to cause the apparatus to:
  - select a search space configuration for transmission of a plurality of control channel elements (CCEs) to convey a downlink control information (DCI) message of a subframe, wherein the search space configuration comprises a first CCE carrying a first portion of the DCI message in a first symbol of the subframe and a second CCE carrying a second portion of the DCI message in a second symbol of the subframe;
  - transmit, based at least in part on the selecting, the DCI message.

20. The apparatus of claim 19, wherein the instructions are further executable by the processor to:
- transmit, based at least in part on the search space configuration, the plurality of CCEs during at least two symbols of a plurality of symbols used to convey the DCI message.

21. The apparatus of claim 19, wherein the instructions are further executable by the processor to:
- transmit an enabling indication of the search space configuration.

22. The apparatus of claim 21, wherein the enabling indication is transmitted in at least one of a system information block (SIB) message, or a master information block (MIB) message, or a minimal system information block (MSIB) message.

* * * * *